(12) United States Patent
Mandella et al.

(10) Patent No.: US 6,369,928 B1
(45) Date of Patent: Apr. 9, 2002

(54) FIBER-COUPLED, ANGLED-DUAL-ILLUMINATION-AXIS CONFOCAL SCANNING MICROSCOPES FOR PERFORMING REFLECTIVE AND TWO-PHOTON FLUORESCENCE IMAGING

(75) Inventors: Michael J. Mandella, Cupertino; Mark H. Garrett, Morgan Hill; Gordon S. Kino, Stanford, all of CA (US)

(73) Assignee: Optical Biopsy Technologies, Inc., San Jose, CA (US)

( * ) Notice: Subject to any disclaimer, the term of this patent is extended or adjusted under 35 U.S.C. 154(b) by 0 days.

(21) Appl. No.: 09/705,284

(22) Filed: Nov. 1, 2000

(51) Int. Cl.[7] .............................................. G02B 26/08
(52) U.S. Cl. ...................... 359/204; 359/214; 359/372; 359/385
(58) Field of Search ................................. 359/204, 214, 359/225, 368, 372, 373, 385, 387; 250/458.1

(56) References Cited

U.S. PATENT DOCUMENTS

| | | | |
|---|---|---|---|
| 5,034,613 A | 7/1991 | Denk et al. | 250/458.1 |
| 5,120,953 A | 6/1992 | Harris | 250/227.2 |
| 5,161,053 A | 11/1992 | Dabbs | 359/384 |
| 5,796,477 A | * 8/1998 | Teich et al. | 356/318 |
| 5,969,854 A | 10/1999 | Stelzer et al. | 359/385 |
| 5,973,828 A | 10/1999 | Webb | 359/385 |
| 6,020,591 A | 2/2000 | Harter et al. | 250/458.1 |
| 6,028,306 A | 2/2000 | Hayashi | 250/235 |
| 6,055,097 A | * 4/2000 | Lanni et al. | 359/386 |
| 6,057,952 A | 5/2000 | Kubo et al. | 359/196 |
| 6,064,518 A | 5/2000 | Stelzer et al. | 359/368 |
| 6,069,698 A | 5/2000 | Ozawa et al. | 356/345 |
| 6,088,145 A | 7/2000 | Dickensheets et al. | 359/196 |

FOREIGN PATENT DOCUMENTS

DE 43264763 2/1995

OTHER PUBLICATIONS

Lindek et al., "Optical transfer functions for Confocal theta fluorescence microscopy", J. Opt. Soc. Am. A, vol. 13, No. 3, Mar. 1996, pp. 479–482.

Stelzer et al., "Fundamental reduction of the observation volume in far–field light microscopy by detection orthogonal to the illumination axis: confocal theta microscopy", Optics Communcations 111 (1994), pp. 536–547.

Hell et al., "Far–field fluorescence microscopy with three–dimensional resolution in the 100–nm range", Journal of Microscopy, vol. 187, Pt. 1, Jul. 1997, pp. 1–7.

Stelzer et al., "A new tool for the observation of embyros and other large specimens: confocal theta fluorescence micorscopy", Journal of Microscopy, vol. 179, Pt.1, Jul. 1995, pp. 1–10.

(List continued on next page.)

Primary Examiner—Mark A Robinson
(74) Attorney, Agent, or Firm—Lumen Intellectual Property Services, Inc.

(57) ABSTRACT

This invention provides an angled-dual-illumination-axis confocal scanning microscope comprising a fiber-coupled, angled-dual-illumination-axis confocal scanning head and a vertical scanning unit. The angled-dual-illumination-axis confocal scanning head is configured such that two illumination beams intersect optimally at an angle $\theta$ within an object and the scanning is achieved by pivoting the illumination beams and their corresponding observation beams using a single scanning element, thereby producing an arc-line scan. The vertical scanning unit causes the angled-dual-illumination-axis confocal scanning head to move towards or away from the object, thereby yielding a vertical cross-section scan of the object. The angled-dual-illumination-axis confocal scanning microscope have advantages of enhanced resolution, faster scanning, higher sensitivity and larger dynamic range of detection, a larger field of view and a longer working distance, and a compact and integrated construction.

84 Claims, 12 Drawing Sheets

OTHER PUBLICATIONS

Webb et al., "Confocal microscope with large field and working distance", Applied Optics, vol. 38, No. 22, Aug. 1, 1999, pp. 4870–4875.

Sinzinger et al., "Planar optical Confocal microscope for imaging and sensing" European Optical Society Topical Meetings Digest Series, vol. 9, Engelberg, Switzerland, Apr. 1996 pp. 1–3.

Klug et al., "Implementation of multilens micro–optical systems with large numerical aperture by stacking of microlenses", Applied Optics, vol. 38, No. 34, Dec. 1, 1999.

Beaurepaire et al., "Combined scanning optical coherence and two–photon–excited fluorescence microscopy", Optics Letters, vol. 24, No. 14, 1999, pp. 969–971.

Lakowicz et al., "Two–color Two–photon Excitation of Fluorescence", Photochemistry and Photobiology, 64(4), 1996, pp. 632–635.

Lindek et al., "Resolution improvement by nonconfocal theta microscopy", Optics Letters, vol. 24, No. 21, Nov. 1, 1999, pp. 1505–1507.

* cited by examiner

FIBER-COUPLED, ANGLED-DUAL-ILLUMINATION-AXIS CONFOCAL SCANNING MICROSCOPES FOR PERFORMING REFLECTIVE AND TWO-PHOTON FLUORESCENCE IMAGING

FIELD OF THE INVENTION

This invention relates generally to the field of confocal microscopes and two-photon fluorescence microscopy. In particular, it is related to an assembly of fiber-coupled, angled-dual-illumination-axis confocal scanning microscopes with integrated structure, enhanced resolution, higher sensitivity, and versatile imaging capabilities.

BACKGROUND ART

The advent of fiber optics and laser technology has brought a renewed life to many areas of conventional optics. Confocal microscopes, for example, have enjoyed higher resolution, more integrated structure, and enhanced imaging capability. Consequently, confocal microscopes have become increasingly powerful tools in a variety of applications, including biological and medical imaging, optical data storage and industrial applications.

In recent years, a great deal of ingenuity has accordingly been devoted to improving the axial resolution of confocal microscopes using high numerical aperture (NA) lenses. A particularly effective approach is to spatially arrange two separate illumination and observation objective lenses, or illumination and observation beam paths, in such a way that the illumination beam and the observation beam intersect at an angle theta ($\theta$) at the focal points, so that the overall point-spread function for the microscope, i.e., the overlapping volume of the illumination and observation point-spread functions results in a substantial reduction in the axial direction. A confocal microscope with such an angled, dual-axis design is termed a confocal theta microscope, or an angled-dual-axis confocal microscope, hereinafter. Its underlying theory is described below for the purpose of elucidating the principle of the present invention. A more detailed theory of the confocal theta microscopy can be found in "Fundamental reduction of the observation volume in far-field light microscopy by detection orthogonal to the illumination axis: confocal theta microscopy" of Stelzer et al., Optics Communications 111 (1994), pp.536–547; U.S. Pat. No. 5,973,828; "Confocal microscope with large field and working distance" of Webb et al., Applied Optics, Vol.38, No.22, pp.4870; and "A new tool for the observation of embryos and other large specimens: confocal theta fluorescence microscopy" of Stelzer et al., Journal of Microscopy, Vol.179, Part 1, pp. 1; all incorporated by reference. It should be noted that high NA objectives are used in these prior art systems to achieve high resolution.

The region of the point-spread function of a confocal microscope's objective that is of most interest is the region in which the point-spread function reaches its maximum value. This region is referred to as the "main lobe" of the point-spread function in the art. It is typically characterized in three dimensions by an ellipsoid, which extends considerably further in the axial direction than in the transverse direction. This characteristic shape is the reason that the axial resolution is inherently poorer than the transverse resolution in a conventional confocal microscope. When the main lobes of the illumination and observation point-spread functions are arranged to intersect at an angle in a confocal theta microscope, however, a predominantly transverse and therefore narrow section from one main lobe is made to multiply (i.e., zero out) a predominantly axial and therefore long section from the other main lobe. This optimal multiplication of the two point-spread functions reduces the length of the axial section of the overall point-spread function, thereby enhancing the overall axial resolution. The shape of the overall point-spread function can be further adjusted by varying the angle at which the main lobes of the illumination and observation point-spread functions intersect.

In addition to achieving higher resolution, an angled-dual-axis confocal microscope described above renders a number of additional important advantages. For instance, since the observation beam is positioned at an angle relative to the illumination beam, scattered light along the illumination beam does not easily get passed into the observation beam, except in the region where the beams overlap. This substantially reduces scattered photon noise in the observation beam, thus enhancing the sensitivity and dynamic range of detection. Moreover, by using low NA focusing elements (or lenses) for focusing the illumination and observation beams, the illumination and observation beams do not become overlapping until very close to the focus. Therefore, such an arrangement prevents scattered light in the illumination beam from directly "jumping" to the corresponding observation beam, thereby further filtering out scattered photon noise in the observation beam. As such, an angled-dual-axis confocal microscope using relatively low NA lenses has much lower noise and is capable of providing much higher contrast when imaging in a scattering medium, rendering it highly suitable for imaging within biological specimens.

The aforementioned angled-dual-axis confocal arrangement can be further utilized to perform two-photon (and multi-photon) fluorescence microscopy, so as to exploit its high resolution and low noise capabilities. In such an arrangement, two illumination beams are directed to intersect optimally, such that each of the two observation beams thus produced is in an optimal confocal arrangement with its corresponding illumination beam.

Whereas traditional single-photon fluorescence laser microscopy requires only a single photon $\lambda_3$ for excitation, two-photon fluorescence microscopy requires simultaneous absorption of two photons $\lambda_1$ and $\lambda_2$ for excitation. In terms of energy, $hc/\lambda_3 = hc/\lambda_1 + hc/\lambda_2$. Thus, $\lambda_1$ and $\lambda_2$ are both longer in wavelength than $\lambda_3$. However, it is important to note that $\lambda_2$ need not necessarily equal $\lambda_1$. Indeed, any combination of wavelengths can be used, so long as the net energy requirements for exciting the particular types of fluorophores being used are satisfied. An inherent advantage of two-photon fluorescence is that the two-photon absorption occurs only within a confined region where the two incident beams overlap, hence eliminating unwanted, spurious fluorescence and scattered light. Moreover, because two-photon excitation depends on the square of the excitation power, the excited volume is restricted to the focal point, providing an equivalent of confocal conditions. Additional advantages provided by two-photon (and multi-photon) excitation include longer penetration depth within a specimen (since longer wavelengths are employed, thus reducing scattering losses), reduced photobleaching and phototoxicity, and reduced background noise.

Accordingly, two-photon excitation has been of considerable interest for microscopy, fluorescence spectroscopy, and for single-molecule detection. For instance, two-photon fluorescence microscopy has been used in the art for imaging various types of fluorophores (or fluorophore indicators attached to proteins and biological cells) that are of particular interest to biomedical applications. It has also been used as an alternative way of attaining enhanced resolution and greater flexibility in imaging. The prior art effort in utilizing two-photon microscopy is exemplified by U.S. Pat. No. 5,034,613 of Denk et al.; U.S. Pat. No. 6,020,591 of Harter et al.; "Two-color Two-Photon Excitation of Fluorescence" by Lakowicz et al. in Photochemistry and Photobiology, 64(4), (1996) pp.632–635; "Combined scanning optical coherence and two-photon-excited fluorescence microscopy" by Beaurepaire et al. in Optics Letters, Vol.24, No.14, (1999) pp. 969–971; and "Resolution improvement in non-confocal theta microscopy" by Lindek et al. in Optics Letters, Vol.24, No.21, (1999) pp.1505–1507. None of these prior art systems, however, exploit advantages gained by using relatively low NA lenses and hence allow themselves to be miniaturized or have sufficiently long working distances needed for in-vivo biological applications. Moreover, the scanning mechanisms employed in some of these systems are designed such that they do not lend themselves to fast speed and high precision scanning.

Furthermore, in recent years optical fibers have been used in confocal systems to transmit light more flexibly. A single-mode fiber is typically used so that an end of the fiber is also conveniently utilized as a pinhole for both light emission and detection. This arrangement is not susceptible to the alignment problems the mechanical pinholes in the prior art systems tend to suffer. Moreover, the use of optical fibers enables the microscopes to be more flexible and compact in structure, along with greater maneuverability in scanning.

Hence, what is needed in the art is a confocal scanning microscope for performing single-photon, two-photon, and higher order multi-photon fluorescence microscopy that achieves enhanced axial resolution, higher sensitivity and larger dynamic range of detection, a longer working distance and a larger field of view, fast and high precision scanning. The desired confocal scanning microscope should also have an integrated and scalable structure, rendering it a modular and versatile device, and further capable of being miniaturized for in-vivo biological applications.

OBJECTS AND ADVANTAGES

Accordingly it is a principal object of the present invention to provide an angled-dual-illumination-axis confocal scanning microscope that utilizes two illumination beams in an angled-dual-axis confocal arrangement, so as to exploit enhanced axial resolution and higher sensitivity rendered by the angled-dual-axis confocal arrangement. The angled-dual-illumination-axis confocal scanning microscope provides additional advantages of high-speed scanning, larger dynamic range of detection, a larger field of view, a longer working distance, and a compact and integrated construction. Moreover, the angled-dual-illumination-axis confocal scanning microscope of the present invention is highly versatile in its imaging capabilities, providing an assortment of reflectance images and fluorescence images of many types, including single-photon fluorescence, two-photon fluorescence, and higher order multi-photon fluorescence.

It is another further object of the present invention to provide an assembly of fiber-based angled-dual-illumination-axis confocal scanning systems that advantageously combine the angled-dual-illumination-axis confocal scanning microscope of the present invention and fiber-optic components.

It is a further object of the present invention to provide a miniaturized angled-dual-illumination-axis confocal scanning microscope for in-vivo biological applications.

These and other objects and advantages will become apparent from the following description and accompanying drawings.

SUMMARY OF THE INVENTION

This invention provides an angled-dual-illumination-axis confocal scanning microscope, comprising an angled-dual-illumination-axis confocal scanning head and a vertical scanning unit. The angled-dual-illumination-axis confocal scanning head further comprises first and second optical fibers, an angled-dual-illumination-axis focusing means, and a scanning means.

From a first end of the first optical fiber a first illumination beam with a first wavelength emerges. The angled-dual-illumination-axis focusing means serves to focus the first illumination beam to a first diffraction-limited focal volume along a first axis within an object. From a first end of the second optical fiber a second illumination beam with a second wavelength emerges. The angled-dual-illumination-axis focusing means focuses the second illumination beam to a second diffraction-limited focal volume along a second axis within an object. The angled-dual-illumination-axis focusing means further receives a first observation beam emanated from the second focal volume within the object, and focuses the first observation beam to the first end of the second optical fiber. The angled-dual-illumination-axis focusing means additionally receives a second observation beam emanated from the first focal volume within the object, and focuses the second observation beam to the first end of the first optical fiber. The angled-dual-illumination-axis focusing means is so designed that the first and second axes intersect at an angle $\theta$ within the object, such that the first and second focal volumes intersect optimally at a confocal overlapping volume. The scanning means, in the form of a single scanning element disposed between the angled-dual-illumination-axis focusing means and the object, is positioned such that it receives the first and second illumination beams from the angled-dual-illumination-axis focusing means and directs the illumination beams to the object. The scanning means further collects the first and second observation beams emanated from the object and passes the observation beams to the angled-dual-illumination-axis focusing means. Moreover, the scanning means is capable of pivoting the illumination beams and their corresponding observation beams jointly in such a way that the first and second axes remain intersecting optimally at a fixed angle $\theta$ and that the confocal overlapping volume moves along an arc-line within the object, thereby producing an arc-line scan.

The vertical scanning unit comprises a vertical translation means and a compensation means. The vertical translation means is mechanically coupled to the angled-dual-illumination-axis confocal scanning head, such that it causes the angled-dual-illumination-axis confocal scanning head to move towards or away from the object, whereby a succession of arc-line scans that progressively deepen into the object is produced, providing a two-dimensional vertical cross-section scan of the object. The compensation means keeps the optical path lengths of the illumination and observation beams substantially unchanged, thereby ensuring the optimal intersection of the first and second focal volumes in the course of vertical scanning. Altogether, the angled-dual-illumination-axis confocal scanning microscope of the present invention is designed such that it is capable of performing vertical cross-section scanning in a line-by-line fashion with enhanced axial (i.e., vertical) resolution and greater speed, while maintaining a workable working distance and a large field of view. Additionally, the object may be moved incrementally in a direction perpendicular to the vertical cross-section scan plane as each vertical cross-section scan is completed, resulting in a plurality of vertical cross-section images that can be assembled into a three-dimensional image of a region within the object.

It should be understood that when describing the intersection of the illumination and observation beams in this specification, the term "optimal" means that the first and second focal volumes [i.e., the main lobe of the first illumination beam's point-spread function (which coincides with the main lobe of the second observation beam's point-spread function) and the main lobe of the second illumination beam's point-spread function (which coincides with the main lobe of the first observation beam's point-spread function)] intersect in such a way that their respective centers substantially coincide and the resulting overlapping volume has comparable transverse and axial extents. This optimal overlapping volume is termed "confocal overlapping volume" in this specification. As such, in the angled-dual-illumination-axis arrangement described above, the first and second illumination beams intersect optimally with their corresponding observation beams respectively. It should be noted that in this arrangement, the axis of the first observation beam is collinear with the axis of the second illumination beam, however with the optical power of each beam traveling in the opposite directions. Likewise, the axis of the second observation beam is collinear with the axis of the first illumination beam, however with the optical power of each beam traveling in the opposite directions.

Moreover, the observation beams described above should be construed in a broad sense as each carrying any light transmitted back from the object, including reflected light, scattered light, and fluorescent light. The first and second illumination beams may have the same wavelength, for instance, in the infrared range. The fluorescence light thus produced would include one-color two-photon (and multi-photon) fluorescence. The first and second illumination beams may also have very different wavelengths. For instance, the first wavelength may be in the infrared range, while the second wavelength lies in the visible range. The fluorescence light thus obtained would include two-color two-photon (and possibly multi-photon) fluorescence. A skilled artisan will know how to selectively make use of a particularly type of light collected from the object and filter out spurious background light for a given application.

In addition to collecting first and second observation beams, the angled-dual-illumination-axis confocal scanning microscope of the present invention is equipped to provide one or more revenues for collecting additional light beams emanated from the object. As a way of example, a third observation beam comprising predominantly fluorescence light can be collected by the scanning means, and pivoted concurrently along with the first and second illumination beams and the corresponding first and second observation beams. The third observation beam thus collected is then directed to an auxiliary focusing means, which in turn focuses the third observation beam to an input end of a third optical fiber. In this case, the point-spread function of the third observation beam is caused to overlap with the confocal overlapping volume of the first and second illumination beams, hence yielding a higher resolution by way of an effective multiplication of the point-spread functions of all three beams. Accordingly, such a way of collection is termed "confocal-collection", hereinafter. And the first, second and third optical fibers are preferably single-mode fibers in this case. Alternatively, the third observation beam can be collected by an auxiliary light collecting means positioned anywhere in the proximity of the object—effectively "staring" at the object, and is not in optical communication with the scanning means. The auxiliary light collecting means in turn focuses the third observation beam to an input end of a third optical fiber (or directs the third observation beam onto a "staring" optical detector). The third fiber in this case is used for collecting light only, and is preferably a larger diameter multi-mode fiber, so as to maximize the collection efficiency of light emanating from the confocal overlapping volume throughout its motion within the object during scanning. Additionally, a light detector may be optically coupled to an output end of the third fiber, to detect light in the third observation beam. This way of collection is termed "non-confocal-collection", hereinafter.

In an angled-dual-illumination-axis confocal scanning head of the present invention, the angled-dual-illumination-axis focusing means generally comprises an assembly of beam focusing, collimating, and deflecting elements. Such elements can be selected from the group of refractive lenses, diffractive lenses, GRIN lenses, focusing gratings, microlenses, holographic optical elements, binary lenses, curved mirrors, flat mirrors, prisms and the like. A crucial feature of the angled-dual-illumination-axis focusing means is that it provides first and second illumination axes that intersect optimally at an angle $\theta$. The scanning means typically comprises an element selected from the group consisting of mirrors, reflectors, acousto-optic deflectors, electro-optic deflectors, mechanical scanning mechanisms, and Micro-Electro-Mechanical-Systems (MEMS) scanning micromirrors. A key feature is that the scanning means is in the form of a single element, as opposed to two or more separate scanning elements in many prior art confocal scanning systems. A preferred choice for the scanning means is a flat pivoting mirror, particularly a silicon micro-machined scanning mirror for its compact and light-weight construction. Moreover, the first and second optical fibers are preferably single-mode fibers, for the ends of single-mode fibers provide nearly point-like light sources and detectors.

A unique feature of the angled-dual-illumination-axis confocal scanning head of the present invention is that the scanning means is placed between the angled-dual-illumination-axis focusing means and the object to be examined. This enables the best on-axis illumination and observation point-spread functions to be utilized throughout the entire angular range of an arc-line scan, thereby providing greater resolution over a larger transverse field of view, while maintaining diffraction-limited (or relatively aberration-free) performance. Such an arrangement is made possible by taking advantage of the longer working distance rendered by using relatively lower NA focusing elements or lenses in the angled-dual-illumination-axis focusing means.

Another important advantage of the angled-dual-illumination-axis arrangement of the present invention is that since each observation beam is positioned at an angle relative to its corresponding illumination beam, scattered (or fluorescent) light along an illumination beam does not easily get passed into its corresponding observation beam, except in the region where the beams overlap. Under certain modes of operation, which are exemplified below, this substantially reduces scattered (or fluorescent) photon noise in the particular observation beam (or beams) being used, thus enhancing the sensitivity and dynamic range of detection. Moreover, by using low NA focusing elements (or lenses) in an angled-dual-illumination-axis confocal scanning system of the present invention, the illumination beams and their corresponding observation beams do not become overlapping until very close to the focus. Such an arrangement further prevents scattered (or fluorescent) light in each illumination beam from directly "jumping" to the corresponding observation beam, thereby further filtering out scattered (or fluorescent) photon noise in the observation beam. Altogether, the angled-dual-illumination-axis confocal system of the present invention has much lower noise and is capable of providing much higher contrast when imaging in a scattering (or fluorescent) medium than the prior art confocal systems employing high NA lenses, rendering it highly suitable for imaging within biological specimens.

A further advantage of the present invention is that the entire angled-dual-illumination-axis confocal scanning head can be mounted on a silicon substrate etched with precision V-grooves where various optical elements are hosted. Such an integrated device offers a high degree of integrity, maneuverability, scalability, and versatility, while maintaining a workable working distance and a large field of view. In particular, a micro-optic version of an integrated, angled-dual-axis confocal scanning head of the present invention can be very useful in biological and medical imaging applications, e.g., endoscopes and hand-held optical biopsy instruments.

As such, the angled-dual-illumination-axis confocal scanning microscope of the present invention is capable of providing an assortment of reflectance and fluorescence images. For instance, a first wavelength-selective-beam-splitting means can be coupled to the first observation beam, diverting a portion of the first observation beam to a first optical detector. The first wavelength-selective-beam-splitting means can be configured to preferentially permit only the reflected light (characterized by a particular wavelength and bandwidth of light) carried by the first observation beam to pass through, thereby providing a first reflectance image signal. A second wavelength-selective-beam-splitting means can be further coupled to the first observation beam, diverting an additional portion of the first observation beam to a second optical detector. The second wavelength-selective-beam-splitting means may be designed to preferentially permit only the particular wavelength and bandwidth of light corresponding to two-photon fluorescence light carried by the first observation beam to pass through, thereby providing a two-photon fluorescence image signal. Likewise, a third wavelength-selective-beam-splitting means can be coupled to the second observation beam, diverting a portion of the second observation beam to a third optical detector. The third wavelength-selective-beam-splitting means can be configured to preferentially permit only the reflected light (characterized by a particular wavelength and bandwidth of light) carried by the second observation beam to pass through, thereby providing a second reflectance image signal. And a fourth wavelength-selective-beam-splitting means may be further coupled to the second observation beam, providing an additional revenue for detecting the two-photon fluorescence light carried by the second observation beam, and so on. All in all, a cascade of the wavelength-selective-beam-splitter means can be optically coupled to either of the first and second observation beams, enabling various components of each of the observation beams to be extracted and detected. Moreover, a superposition of reflectance and two-photon fluorescence images thus obtained would be highly desirable, for it provides complementary information about the morphology and functionality of a biological sample. It should be noted that it is possible to operate the present invention in a number of ways that would provide different combinations of reflectance and fluorescence (single-photon, two-photon, or multiple-photon) images, depending upon the instrument design and the types of light sources/ wavelengths used. It is preferable to design the instrument in a way that maximizes the resolution of the images thus produced and that also minimizes the scattered and/or fluorescent photon noise in the image signal. This can be best accomplished by the following seven design rules, which insure that reflected or fluorescence light generated by each illumination beam is optimally collected only by its corresponding (angularly overlapping) observation beam:

1) In the case where the first observation beam is being used to collect reflectance image information characterized by a first wavelength, the second illumination beam should not include light with the first wavelength, and the first illumination beam must provide light with the first wavelength.

2) In the case where the first observation beam is being used to collect single-photon fluorescence image information characterized by a third wavelength when the object is excited by light of a second wavelength, the second illumination beam should not include single-photon excitation light with the second wavelength, and the first illumination beam should provide single-photon excitation light with the second wavelength.

3) In the case where the first observation beam is being used to collect one-color two-photon (1C2P) fluorescence image information characterized by a fifth wavelength when the object is excited by light of a fourth wavelength, the second illumination beam should not include 1C2P excitation light with the fourth wavelength, and the first illumination beam should provide 1C2P excitation light with the fourth wavelength.

4) In the case where either of the first and second observation beams, or both of the observation beams, are being used to collect two-color two-photon (2C2P) fluorescence image information characterized by an eighth wavelength when the object is excited by light that requires both of sixth and seventh wavelengths, the first and second illumination beams should each provide light with only one of the two required wavelengths, such that 2C2P excitation light is provided only in the region where the two illumination beams overlap both spatially and temporally.

5) In the case where the second observation beam is being used to collect reflectance image information characterized by a ninth wavelength, the first illumination beam should not include light with the ninth wavelength, and the second illumination beam must provide light with the ninth wavelength.

6) In the case where the second observation beam is being used to collect single-photon fluorescence image information characterized by an eleventh wavelength when the object is excited by light of a tenth wavelength, the first illumination beam should not include single-photon excitation light with the tenth wavelength, and the second illumination beam should provide single-photon excitation light with the tenth wavelength.

7) In the case where the second observation beam is being used to collect one-color two-photon (1C2P) fluorescence image information characterized by a thirteenth wavelength when the object is excited by light of a twelfth wavelength, the first illumination beam should not include 1C2P excitation light with the twelfth wavelength, and the second illumination beam should provide 1C2P excitation light with the twelfth wavelength.

The present invention further provides an angled-dual-illumination-axis confocal scanning system, comprising an angled-dual-illumination-axis confocal scanning microscope of the present invention, first and second light sources, and first and second optical detectors. The first light source is optically coupled to a second end of the first optical fiber of the angled-dual-illumination-axis confocal scanning microscope by way of a first wavelength-selective-beam-splitting element, providing the first illumination beam. The first wavelength-selective-beam-splitting element additionally diverts a portion of the second observation beam delivered by the first optical fiber to the first optical detector. Likewise, the second light source is optically coupled to a second end of the second optical fiber of the angled-dual-illumination-axis confocal scanning microscope by way of a second wavelength-selective-beam-splitting element, providing the second illumination beam. The second wavelength selective beam-splitting element additionally diverts a portion of the first observation beam delivered by the second optical fiber to the second optical detector. By selecting appropriate first and second wavelength-selective-beam-splitting elements, various spectral components of the first and second observation beams can be extracted and detected according to the aforementioned design rules In the aforementioned angled-dual-illumination-axis confocal scanning system of the present invention, either of the first and second wavelength-selective-beam-splitting elements can be a dichroic beam-splitter, a dichroic filter, a bandpass filter, a spectral filter, or a wavelength division multiplexer (WDM). Each of the first and second light sources can be a continuous wave (CW) or a pulsed light source, such as a fiber laser, a diode pumped solid state laser, a semiconductor laser, or other suitable fiber-coupled light source known in the art. The optical detector can be a PIN diode, an avalanche photo diode (APD), or a photomultiplier tube. Such an angled-dual-illumination-axis confocal scanning system provides a simple and versatile imaging tool with high resolution and fast scanning capability.

In addition to detecting first and second observation beams, the angled-dual-illumination-axis confocal scanning system of the present invention is equipped to collect a third observation beam comprising predominantly fluorescence light, and directs the third observation beam to an input end of a third optical fiber, as described above. An output end of the third optical fiber can be coupled to a third optical detector, hence providing additional revenue for detecting single-photon or two-photon fluorescence light emanated from the object.

All in all, the angled-dual-illumination-axis confocal scanning microscope of the present invention has advantages of higher resolution, faster scanning, higher sensitivity and larger dynamic range of detection, a larger field of view and a longer working distance, a compact and integrated construction, and great versatility in combining contemporary reflectance and fluorescence imaging.

Moreover, by integrating the angled-dual-illumination-axis confocal scanning microscope of the present invention with fiber-optic components and fiber-coupled laser sources, the angled-dual-illumination-axis confocal scanning systems of the present invention provide a diverse assembly of fiber-based, high resolution and fast scanning systems that can be adapted in a variety of applications, such as in biological and medical imaging, and industrial applications.

The novel features of this invention, as well as the invention itself, will be best understood from the following drawings and detailed description.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations upon, the claimed invention.

Figure 1A:
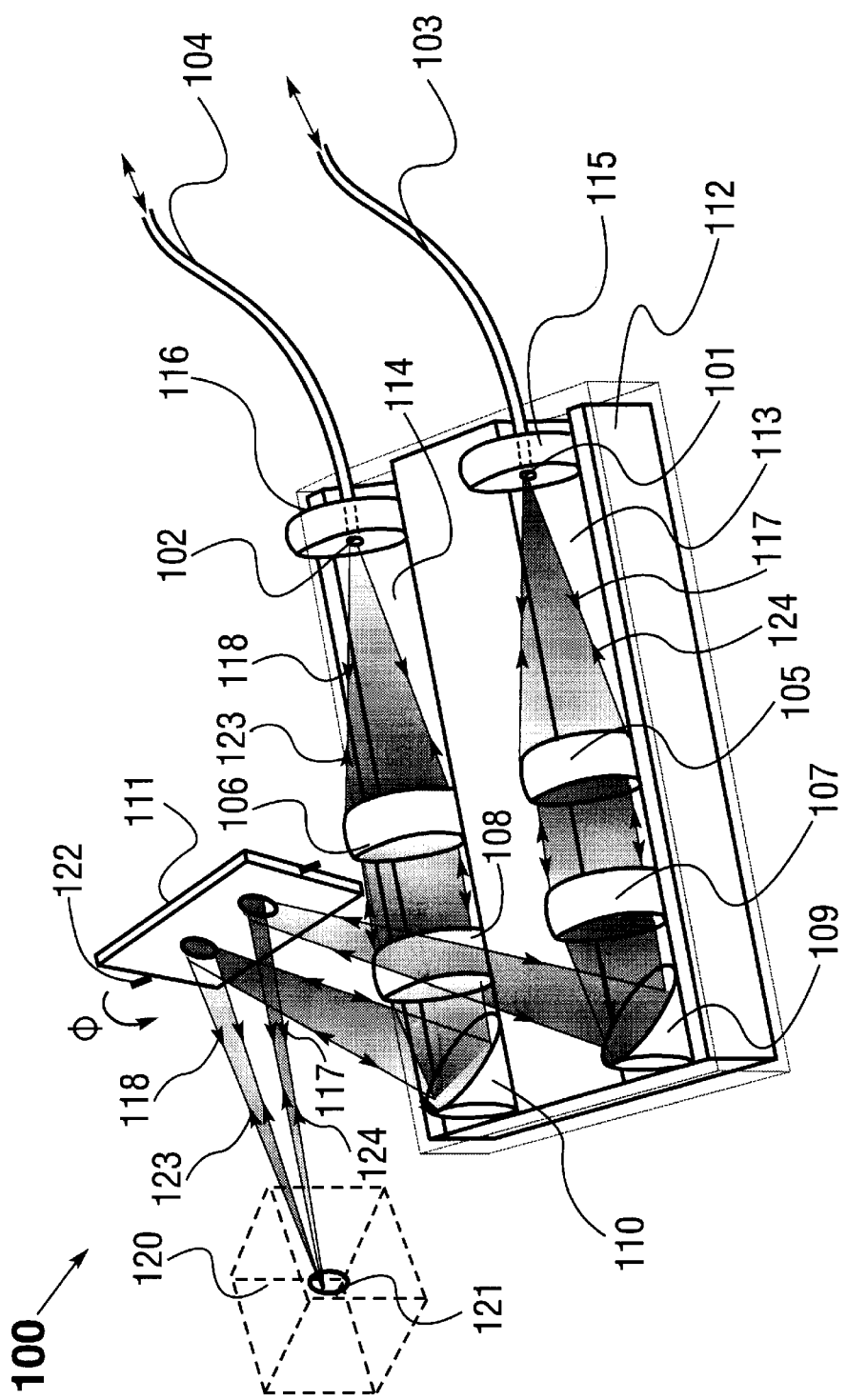
FIGS. 1A–1F show several exemplary embodiments of an angled-dual-illumination-axis confocal scanning head according to the present invention.

FIGS. 1A–1F depict several exemplary embodiments of an angled-dual-illumination-axis confocal scanning head according to the present invention. Depicted in FIG. 1A is a first exemplary embodiment of an angled-dual-illumination-axis confocal scanning head of the present invention. Confocal scanning head 100, by way of example, comprises a first end 101 of a first optical fiber 103 serving as a first point light source; a first end 102 of a second optical fiber 104 serving as a second point light source; an angled-dual-illumination-axis focusing means in the form of a lens assembly consisting of first collimating lens 105, second collimating lens 106, first focusing lens 107, second focusing lens 108, and two beam-aligning elements in the form of first 45-degree mirror 109 and second 45-degree mirror 110; a scanning means in the form of a single scanning mirror 111 having a pivoting axis 122; and a silicon substrate 112. First collimating lens 105, first focusing lens 107, and first mirror 109 are mounted on first V-groove 113 etched on substrate 112. Similarly, second collimating lens 106, second focusing lens 108, and second mirror 110 are mounted on second V-groove 114 etched on substrate 112. First optical fiber 103 and second optical fiber 104 are affixed to cylindrical ferrules 115 and 116 respectively, which are in turn mounted on V-grooves 113 and 114 respectively, such that fiber ends 101 and 102 are held in their respective positions.

In operation, a first illumination beam 117 with a first wavelength emerges from first end 101 of first optical fiber 103 and is directed to first collimating lens 105. The collimated beam is then passed onto and focused by first focusing lens 107. The focused beam is further deflected by first mirror 109 to scanning mirror 111, which in turn directs the beam to a first diffraction-limited illumination focal volume (see FIG. 1B) within an object 120. Similarly, a second illumination beam 118 with a second wavelength emerges from first end 102 of second optical fiber 104 and is directed to second collimating lens 106. The collimated beam is then passed onto and focused by second focusing lens 108. The focused beam is further deflected by second mirror 110 to scanning mirror 111, which in turn directs the beam to a second diffraction-limited illumination focal volume (see FIG. 1B) within an object 120. Accordingly, a first observation beam 123 emanated from a diffraction-limited confocal overlapping volume 121 is first collected by scanning mirror 111, then directed to second mirror 110, which in turn deflects the beam to second focusing lens 108. First observation beam 123 is further collimated by second focusing lens 108 and then focused by second collimating lens 106 to first end 102 of second optical fiber 104. Likewise, a second observation beam 124 emanated from confocal overlapping volume 121 is first collected by scanning mirror 111, then directed to first mirror 109, which in turn deflects the beam to first focusing lens 107. Second observation beam 124 is then collimated by first focusing lens 107 and further focused by first collimating lens 105 to first end 101 of first optical fiber 103. Note that scanning mirror 111 is positioned such that first and second illumination beams 117, 118 intersect optimally at an angle ($\theta$) within object 120.

Figure 1B:
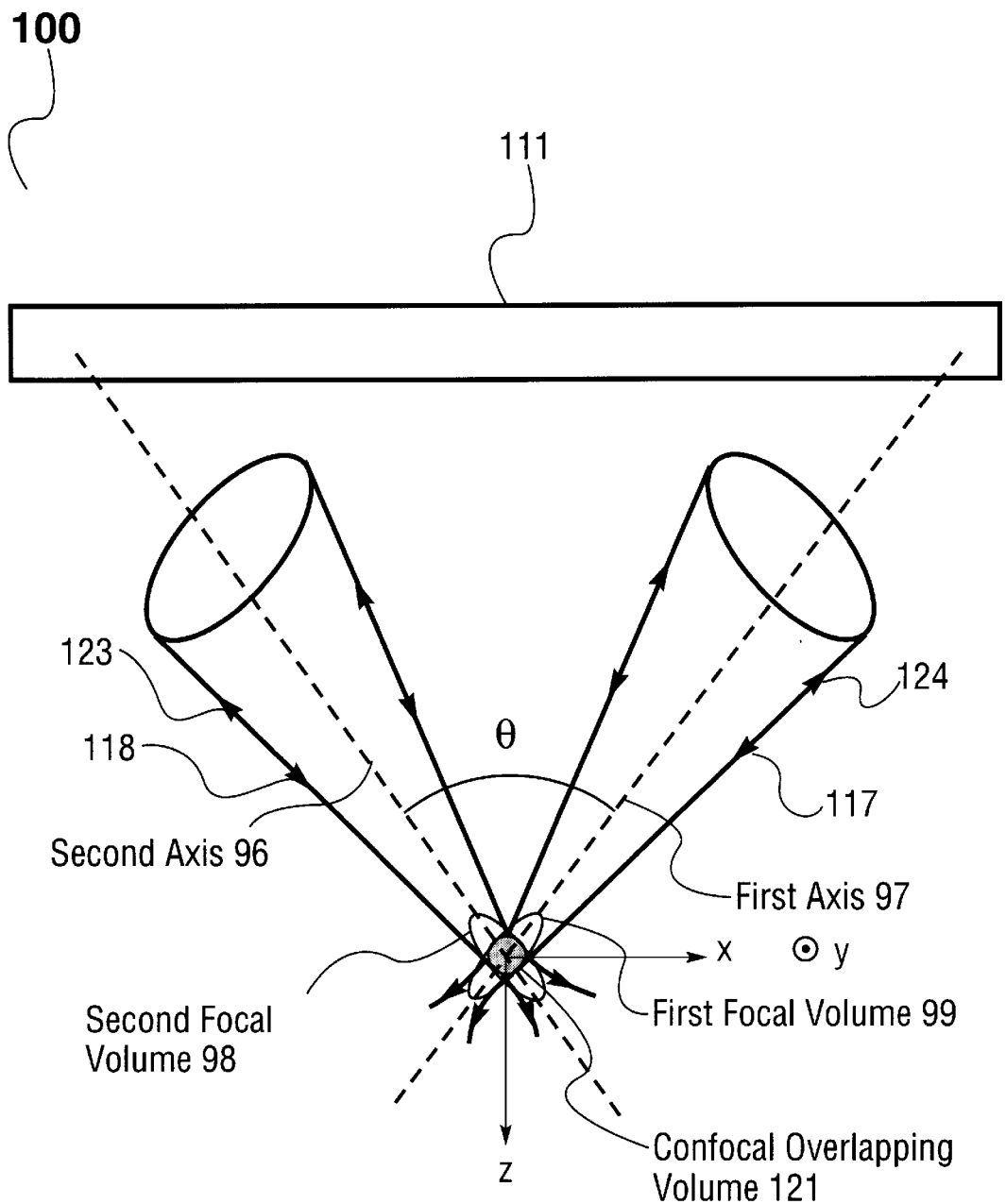

FIG. 1B provides a more detailed illustration of how first and second illumination beams 117, 118 are arranged to intersect within object 120 in FIG. 1A. First illumination beam 117, directed by scanning mirror 111, is focused to a first focal volume 99 oriented along a first axis 97 (within object 120 shown in FIG. 1A). Similarly, second illumination beam 118, directed by scanning mirror 111, is focused to a second focal volume 98 oriented along a second axis 96 within object 120. Accordingly, first and second observation beams 123, 124 emanated from second focal volume 98 and first focal volume 99 respectively are received by scanning mirror 111. First and second axes 97, 96 are directed to intersect at an angle $\theta$, such that first focal volume 99 and second focal volume 98 intersect optimally at confocal overlapping volume 121. A three-dimensional x-y-z coordinate system is provided to describe the spatial extents of confocal overlapping volume 121, where the origin of the coordinate system is set at the center of confocal overlapping volume 121. The z-axis defines the axial (or vertical) direction, whereas x-axis and y-axis (pointing out of the page) represent two orthogonal transverse directions.

It should be emphasized that in the angled-dual-illumination-axis arrangement shown in FIG. 1B, each of the illumination beams intersects optimally with its corresponding observation beam. Moreover, each of the observation beams should be construed in a broad sense as comprising any light transmitted back from the object, including reflected light, scattered light, and fluorescent light. The first and second illumination beams may have the same wavelength, for instance, in the infrared range. The fluorescence light thus produced would include one-color two-photon (1C2P) fluorescence light. And this scenario is not limited only to two-photon excitation; in fact, higher order, such as three or more photons excitation can be accordingly created. (For example, there can be three infrared photons whose energy sums to the energy require for a single photon transition). Alternatively, the first and second illumination beams may have very different wavelengths. For instance, the first wavelength may be in the infrared range, while the second wavelength lies in the visible range. The fluorescence light thus obtained would include two-color two-photon (2C2P) (and possibly higher order multi-photon) fluorescence light. Moreover, there can be situations where the first illumination beam, having a wavelength in the infrared range, provides a first observation beam containing reflected light of the same wavelength; while the second illumination beam, having a wavelength in the visible range, gives rise to single-photon excitation and consequently a second observation beam containing single-photon fluorescence light. All in all, there can be many combinations of the first and second illumination beams with appropriate wavelengths, so as to provide a variety of imaging modes. A skilled artisan will know how to selectively make use of a particular type of light collected from the object and filter out spurious background light for a given application.

In the present invention, various optical elements are aberration-corrected, and single-mode optical fibers are used to provide point light sources and detectors. Accordingly, first focal volume 99 and second focal volume 98 described above are diffraction-limited, defined by the main lobes of the first illumination beam's intensity point-spread function (which also serves as the second observation beam's intensity point-spread function) and second illumination beam's intensity point-spread function (which also serves as the first observation beam's intensity point-spread function). Confocal overlapping volume 121 is likewise diffraction-limited, determined by an optimal overlapping of the main lobes of the first illumination beam's intensity point-spread function and the second illumination beam's intensity point-spread function, as illustrated in FIG. 1B. In general, the overall intensity point-spread function of the system (which determines the imaging resolution) is the product of an illumination beam's intensity point-spread function (illumination PSF) and its corresponding observation beam's intensity point-spread function (observation PSF).

A skilled artisan will know how to carry out a model calculation to estimate the spatial extent of the confocal overlapping volume described above, hence the spatial resolution in three dimensions. As a way of example, for NA of focusing lenses in the range of 0.2–0.3, the intersecting angle $\theta$ between 60-degree and 90-degree, and the wavelength of light near 1.3 $\mu$m, the corresponding axial resolution ranges from 2 to 3.5 $\mu$m, and the transverse resolution (in either x or y direction) goes from 1.5 to 2.5 $\mu$m. Higher resolution can be provided by use of shorter wavelengths.

Now referring back to FIG. 1A, by rotating about axis 122 at a variable angle $\phi$, scanning mirror 111 is further capable of pivoting first illumination beam 117 and first observation beam 123, and second illumination beam 118 and second observation beam 124, concurrently in such a way that first illumination beam 117 and first observation beam 123, and second illumination beam 118 and second observation beam 124, remain intersecting optimally at angle $\theta$ and that confocal overlapping volume 121 at the intersection of the beams moves along an arc-line within object 120, thereby producing an arc-line scan.

It should be noted that an important characteristic of the arc-line scan described above is that the relative spatial orientation between first illumination beam 117 and first observation beam 123, and between second illumination beam 118 and second observation beam 124, stays fixed in the course of the entire scan, once the two beams are arranged to intersect in an optimal manner initially. This is in distinct contrast with the prior art confocal theta scanning systems, where the illumination and observation beams need to be separately adjusted at each scan point, in order to ensure an optimal intersection. Consequently, the scans performed by angled-dual-illumination-axis confocal scanning head 100 of the present invention are inherently of higher precision and faster speed, and are also less laborious to carry out.

Figure 1C:
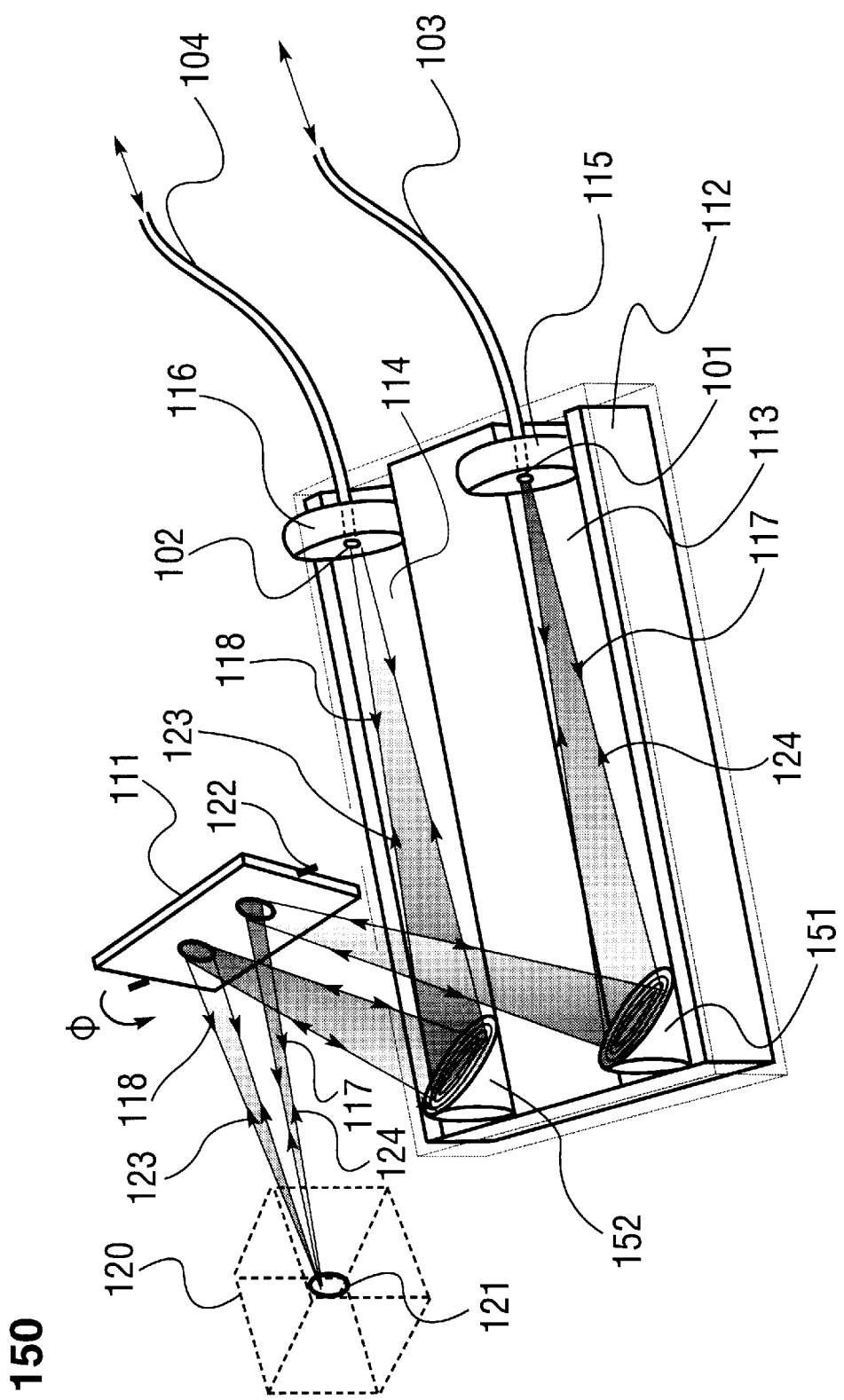

FIG. 1C shows a second exemplary embodiment of an angled-dual-illumination-axis confocal scanning head of the present invention. In angled-dual-illumination-axis confocal scanning head 150, a first reflective focusing element 151 is implemented to replace an assembly of first collimating lens 105, first focusing lens 107 and first mirror 109 in FIG. 1A, providing a dual function of focusing and deflecting first illumination beam 117 and second observation beam 124. Likewise, a second reflective focusing element 152 is used to replace an assembly of second mirror 110, second focusing lens 108 and second collimating lens 106 in FIG. 1A, providing a dual function of focusing and deflecting second illumination beam 118 and first observation beam 123. The remainder of angled-dual-illumination-axis confocal scanning head 150 shares the same components with angled-dual-illumination-axis confocal scanning head 100 of FIG. 1A, as indicated by those labeled with identical numbers. By way of example, first and second reflective and focussing elements 151, 152 are in the form of two diffractive lenses with reflective coatings. The proper design of such reflective diffraction lenses can be determined by commercially available computer modeling programs and is well known in the art of diffractive lens design. First and second reflective focusing elements 151, 152 can alternatively be in the form of curved mirrors. In some cases of using curved mirrors such as ellipsoidal mirrors (each having two foci), it is desirable to place fiber ends 101, 102 at the respective first focal points of the two ellipsoidal mirrors serving as reflective and focusing elements 151, 152, thereby focusing first and second illumination beams 117, 118 at the respective second focal points of focusing elements 151, 152. All in all, the overall operation of angled-dual-illumination-axis confocal scanning head 150 is similar to the working of angled-dual-illumination-axis confocal scanning head 100, as described above.

Figure 1D:
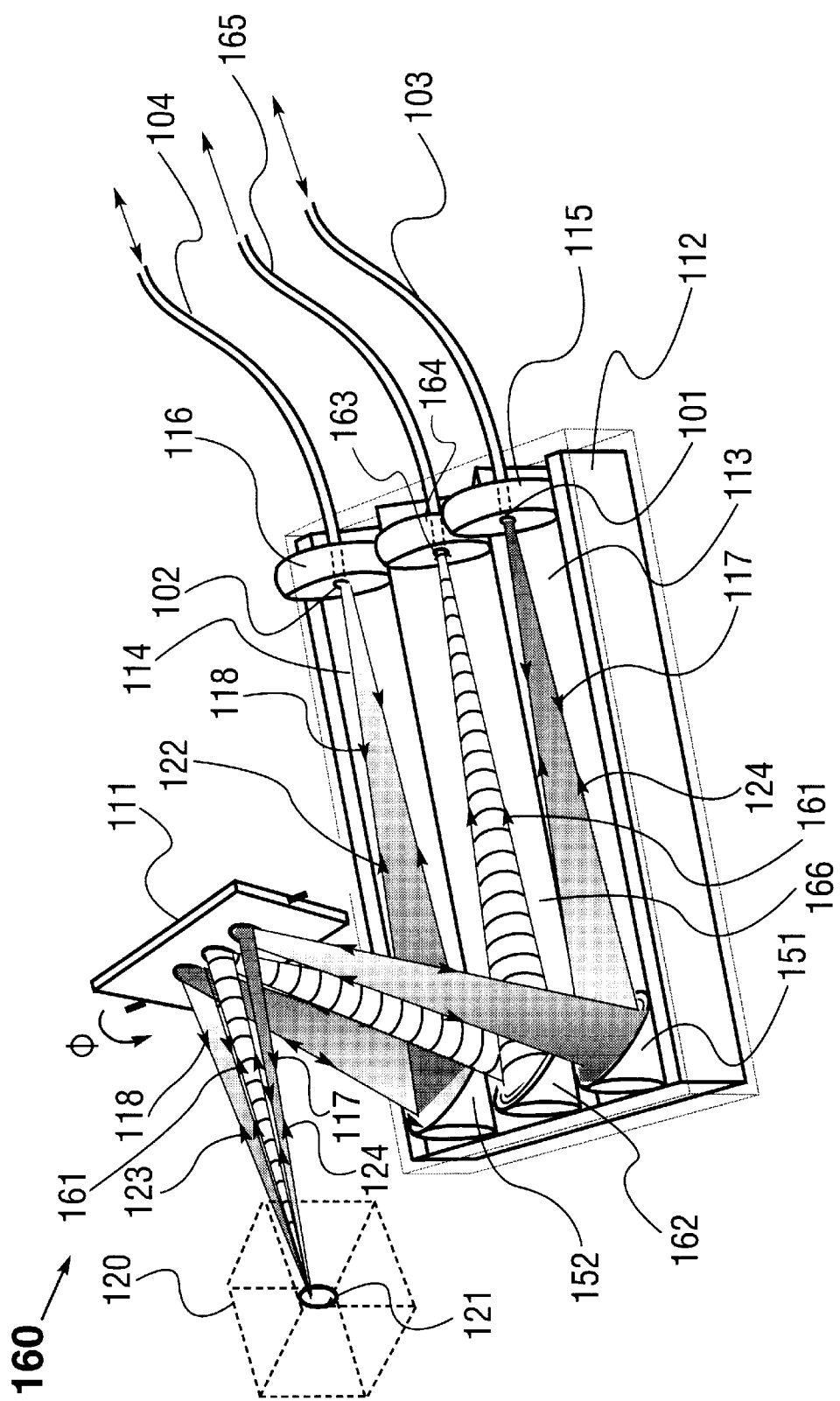

The embodiment of FIG. 1C (or FIG. 1A) may be further equipped to provide a "confocal-collection" of a third observation beam emanated from confocal overlapping volume 121 within object 120. As a way of example, FIG. 1D depicts a third embodiment of an angled-dual-illumination-axis confocal scanning head of the present invention. In angled-dual-illumination-axis confocal scanning head 160, in addition to collecting first and second observation beams 123, 124, a third observation beam 161 emanated from confocal overlapping volume 121 within object 120 is collected by scanning mirror 111. Third observation beam 161 is then directed to a third reflective and focusing element 162, which in turn focuses third observation beam 161 to a first end 163 of a third optical fiber 165. As in the case of first reflective and focusing element 151, or second reflective and focusing element 152, third reflective and focusing element 162 is mounted in a third V-groove 166 on silicon substrate 112, along with a third cylindrical ferrule 164 for affixing first end 163 of third optical fiber 165. The remainder of angled-dual-illumination-axis confocal scanning head 160 shares the same components with angled-dual-illumination-axis confocal scanning head 150 of FIG. 1C, as indicated by those labeled with identical numbers. First, second, and third optical fibers 103, 104, 165 in this case are preferably single-mode fibers. In applications where each of the three fibers supports a different wavelength of light, each fiber may be of a different diameter so to provide single-mode operation.

It should be pointed out that in the embodiment of FIG. 1D, third observation beam 161 may comprise predominantly fluorescence light excited by both of the first and second illumination beams, thereby providing an additional revenue for collecting and detecting fluorescence light. Moreover, since third observation beam 161 is jointly pivoted by scanning mirror 111 along with first and second illumination beams 117, 118, and first and second observation beams 123, 124, the observation intensity point-spread function of third observation beam 161 is further multiplied with the illumination intensity point-spread function associated with confocal overlapping volume 121 of first and second illumination beams 117, 118, hence yielding a higher resolution as a result of the product of three confocal PSF's. In applications where both of the first and second illuminations beams are used to excite two-color two-photon fluorescence (in the region where the two beams overlap), the illumination PSF of the system is the product of the two PSF's of the first and second illumination beams. Further, since two-photon fluorescence depends on the "square' of the excitation beam intensity, the imaging resolution corresponds to the "square" of the product of the illumination PSF's, thereby enhancing the resolution effectively by way of a product of four PSF's. In addition, if two-photon fluorescence light (which is at a shorter wavelength relative to the wavelengths of the illumination beams) is collected by third observation beam 161, the corresponding "confocal-collection" can be optimized by use of a third optical fiber 165 that is a single-mode waveguide operating at the (shorter) fluorescence wavelength. In this case, the resolution corresponds with the product of the observation PSF and the "square" of the system illumination PSF, which is effectively a product of five PSF's, thereby further enhancing the resolution.

Figure 1E:
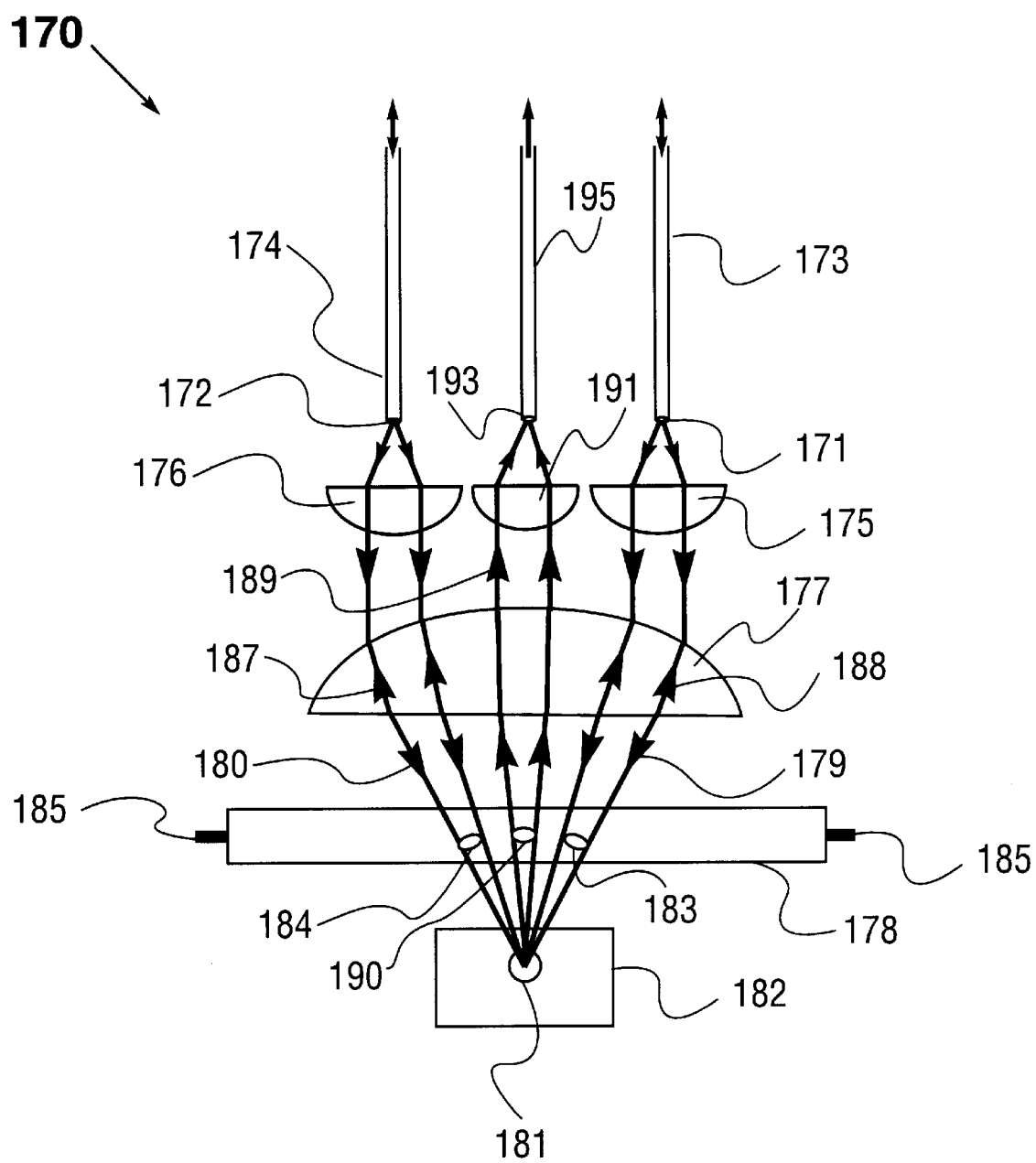

FIG. 1E depicts a simplified schematic illustration of a fourth exemplary embodiment of an angled-dual-illumination-axis confocal scanning head of the present invention. Angled-dual-illumination-axis confocal scanning head 170 comprises a first end 171 of a first optical fiber 173 serving as a first point light source; a first end 172 of a second optical fiber 174 serving as a second point light source; an angled-dual-illumination-axis focusing means in the form of a lens assembly consisting of first collimating lens 175, second collimating lens 176, and illumination-observation lens 177; and a scanning means in the form of a single scanning mirror 178 having a pivoting axis 185.

In operation, a first illumination beam 179 with a first wavelength emerges from first end 171 of first optical fiber 173 and is directed to first collimating lens 175. The collimated beam is then passed onto and focused by illumination-observation lens 177. The focused beam reflects off scanning mirror 178 at first impingement spot 183, and is further directed to a first diffraction-limited illumination focal volume (not shown in FIG. 1E) within an object 182. Similarly, a second illumination beam 180 with a second wavelength emerges from first end 172 of second optical fiber 174 and is directed to second collimating lens 176. The collimated beam is then passed onto and focused by illumination-observation lens 177. The focused beam reflects off scanning mirror 178 at second impingement spot 184, and is further directed to a second diffraction-limited illumination focal volume (not shown in FIG. 1E) within object 182. Accordingly, a first observation beam 187 emanated from a diffraction-limited, confocal overlapping volume 181 is first received by scanning mirror 178 at second impingement spot 184, further passed onto and collimated by illumination-observation lens 177. First observation beam 187 is then focused by second collimating lens 176 to first end 172 of second optical fiber 174. Likewise, a second observation beam 188 emanated from confocal overlapping volume 181 is first received by scanning mirror 178 at first impingement spot 183, further passed onto and collimated by illumination-observation lens 177. Second observation beam 188 is then focused by first collimating lens 175 to first end 171 of first optical fiber 173. Moreover, a third observation beam 189 emanated from confocal overlapping volume 181 is received by scanning mirror 178 at a third impingement spot 190, further passed onto and collimated by illumination-observation lens 177. Third observation beam 189 is then focused by a third collimating lens 191 to a first end 193 of a third optical fiber 195. Note that scanning mirror 178 is positioned such that first and second illumination beams 179, 180 intersect optimally at an angle (θ) within confocal overlapping volume 181, as illustrated in FIG. 1B. By rotating about axis 185, scanning mirror 178 is further capable of pivoting first illumination beam 179 and first observation beam 187, second illumination beam 180 and second observation beam 188, and third observation beam 189, concurrently in such a way that the illumination beams and their respective observation beams remain intersecting optimally at angle θ and that confocal overlapping volume 181 at the intersection of the beams moves along an arc-line within object 182, thereby producing an arc-line scan, as in the embodiment of FIG. 1A or FIG. 1C.

Figure 1F:
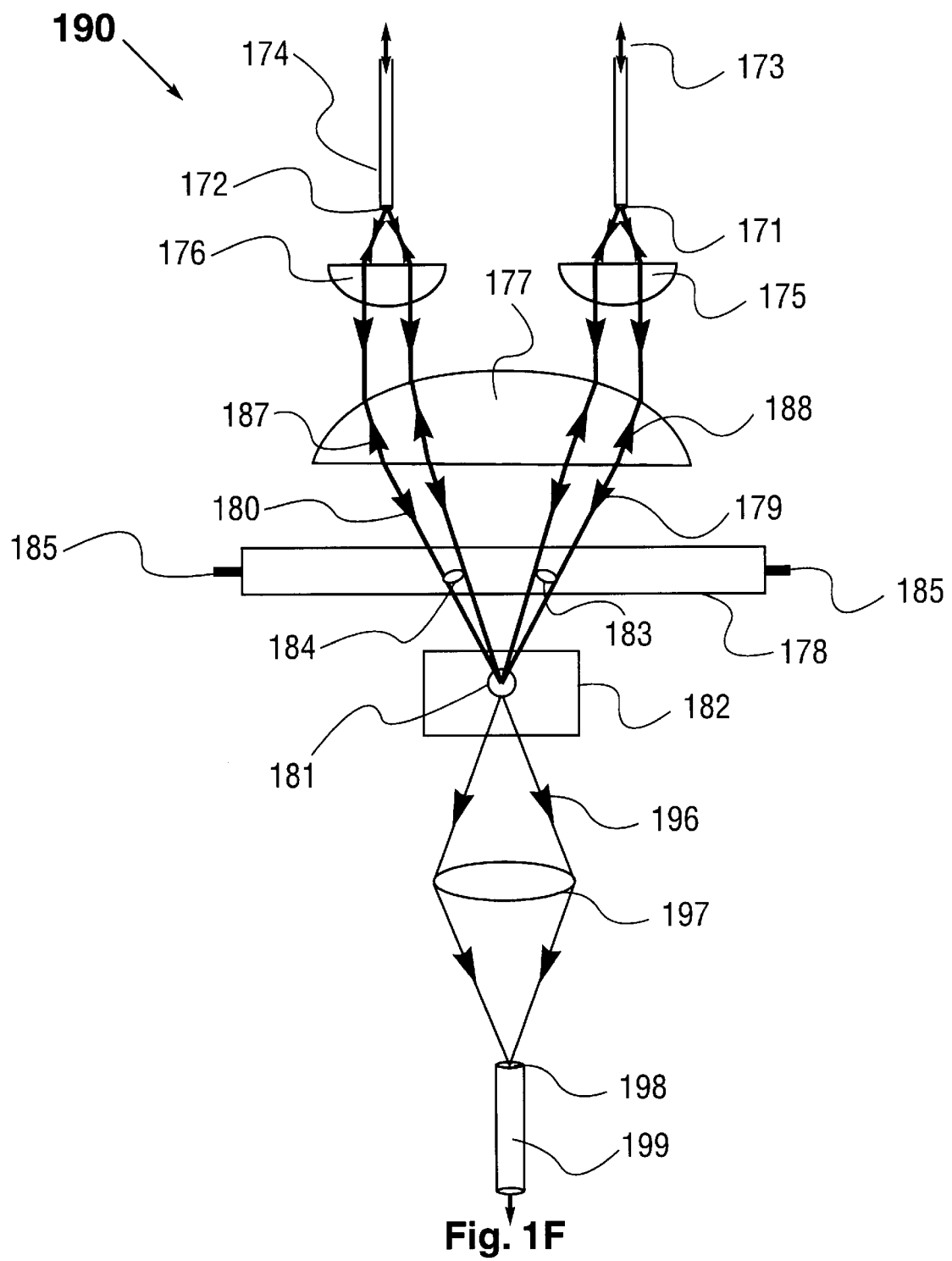

FIGS. 1D–1E provides two exemplary embodiments of a confocal-collection of a third observation beam comprising predominantly fluorescence light from the object. Both of these embodiments are characterized by having a third optical fiber that collects light from the third observation beam. And an input end of the third optical fiber also acts as an aperture for achieving confocal-collection. In some cases this third optical fiber may be replaced by an optical detector of sufficiently small dimensions, or by a combination of a small aperture placed in front of an optical detector. A third observation beam of fluorescence light can be alternatively collected in a non-confocal way. In fact, a beam of fluorescence light can be collected in any direction, given the random—and isotropic—nature of fluorescence. As a way of example, FIG. 1F depicts a fifth embodiment of an angled-dual-illumination-axis confocal scanning head of the present invention, illustrating a non-confocal-collection of a third observation beam emanated from an object. In angled-dual-illumination-axis confocal scanning head 190, an auxiliary focusing means in the form of a focusing lens 197 is positioned to collect a third observation beam 196 emanated from confocal overlapping volume 181 within object 182, and in turn focuses third observation beam 196 to a first end 198 of a third optical fiber 199. The remainder of the embodiment shares the same components as the embodiment of FIG. 1E, as indicated by those labeled with identical numbers, and operates in a substantially similar manner. In this case, since confocal overlapping volume 181 is being scanned by scanning mirror 178, while focusing lens 197 along with third optical fiber 199 remain stationary, third optical fiber 199 is preferably a multi-mode fiber of larger size, so as to maximize the collection efficiency throughout the extent of the scanning motion of confocal overlapping volume 181. (First and second optical fibers 173, 174 are preferably single-mode fibers in this case.) In some cases, third optical fiber 199 may be replaced by an optical detector of sufficiently small dimensions (or by a combination of a small aperture placed and an optical detector), so as to receive light from focusing lens 197 during scanning.

It should be noted that in an angled-dual-illumination-axis arrangement of the present invention, as the above exemplary embodiments depict, since each observation beam is positioned at an angle relative to its corresponding illumination beam, scattered (or fluorescent) light along an illumination beam does not easily get passed into its corresponding observation beam, except in the region where the beams overlap. Under certain modes of operation, which are exemplified below, this substantially reduces scattered (or fluorescent) photon noise in the particular observation beam (or beams) being used, thus enhancing the sensitivity and dynamic range of detection. Moreover, by using low NA focusing elements (or lenses) in an angled-dual-illumination-axis confocal scanning system of the present invention, the illumination beams and their corresponding observation beams do not become overlapping until very close to the focus. Such an arrangement further prevents scattered (or fluorescent) light in each illumination beam from directly "jumping" to the corresponding observation beam, hence further filtering out scattered (or fluorescent) photon noise in the observation beam. Altogether, the angled-dual-illumination-axis confocal system of the present invention has much lower noise and is capable of providing much higher contrast when imaging in a scattering (or fluorescent) medium than the prior art confocal systems employing high NA lenses, rendering it highly suitable for imaging within biological specimens.

FIGS. 1A, 1C–1F serve to illustrate only several of many embodiments of an angled-dual-illumination-axis confocal scanning head of the present invention. In general, the angled-dual-illumination-axis focusing means in an angled-dual-illumination-axis confocal scanning head of the present invention comprises an assembly of one or more elements for beam focusing, collimating, aligning, and deflecting, as exemplified in FIGS. 1A, 1C–1F. Such elements can be in the form of refractive lenses, diffractive lenses, GRIN lenses, focusing gratings, micro-lenses, holographic optical elements, binary lenses, curved mirrors, flat mirrors, prisms and the like. A crucial feature of the angled-dual-illumination-axis focusing means is that it provides dual illumination axes that intersect at an angle, as illustrated in FIG. 1B. The scanning means in an angled-dual-illumination-axis confocal scanning head of the present invention generally comprises an element selected from the group consisting of mirrors, reflectors, acousto-optic deflectors, electro-optic deflectors, mechanical scanning mechanisms, and Micro-Electro-Mechanical-Systems (MEMS) scanning micro-mirrors. A key feature is that the scanning means is in the form of a single scanning element, as opposed to two or more separately functioning scanning elements in prior art confocal scanning systems. A preferred choice for the scanning means is a flat pivoting mirror, particularly a silicon micro-machined scanning mirror for its compact and light-weight construction. (Note: to achieve faster scanning, the scanning means in the embodiments of FIG. 1A, FIG. 1C, and FIG. 1F can be in the form of two smaller coplanar pivoting mirrors, such as two silicon micro-machined scanning mirrors. Owing to their unique fabrication process, these mirrors can be operated in substantially synchronous motion and constructed to co-rotate about a common axis so as to scan illumination and observation beams in a way functionally equivalent to a larger single scanning mirror.) The fabrication processes of silicon scanning mirrors are described in U.S. Pat. Nos. 6,007,208, 6,057,952, 5,872,880, 6,044,705, 5,648,618, 5,969,465 and 5,629,790. The optical fibers in an angled-dual-illumination-axis confocal scanning head of the present invention can be single-mode fibers, or multi-mode fibers. For instance, in the embodiments of FIGS. 1A, 1C–1E, the first, second and third optical fibers are preferably single-mode fibers, for the ends of single-mode fibers provide nearly point-like light sources and detectors. Whereas in the embodiment of FIG. 1F, the third optical fiber can be a multi-mode fiber, so as to collect as much fluorescence light as possible from the moving overlapping confocal volume of the two scanning illumination beams. That is to say that since the fluorescent light source (i.e., the confocal overlapping volume) within the object is moving in a scanned pattern, the third observation beam will not be stationary with respect to the input end of the third optical fiber, thus requiring a fiber with a larger diameter.

A unique feature of the angled-dual-illumination-axis confocal scanning head of the present invention is that the scanning means is placed between the angled-dual-illumination-axis focusing means and the object to be examined. This enables the best on-axis illumination and observation intensity point-spread functions to be utilized throughout the entire angular range of an arc-line scan, thereby providing greater resolution over a larger transverse field of view, while maintaining diffraction-limited performance. Such an arrangement is made possible by taking advantage of the longer working distance rendered by using relatively lower NA focusing elements or lenses in the angled-dual-illumination-axis means. For example, the present invention may use molded aspherical lenses with numerical apertures (NA) in the range of 0.1 to 0.4 that are low cost and readily available in the art. Such lenses have excellent on-axis aberration correction, and are therefore diffraction-limited for on-axis focusing conditions. These lenses normally do not have diffraction-limited performance when focusing off-axis, and thus cannot be used in confocal scanning systems where off-axis performance is important. Such is the case in prior art confocal scanning systems described in U.S. Pat. Nos. 5,973,828 and 6,064,518, where the field of view is limited by the off-axis performance of objective lenses.

Moreover, the specific arrangements among various optical elements and optical fibers in an angled-dual-illumination-axis confocal scanning head can be altered in many ways without deviating from the principle and the scope of the present invention. For instance, the use of collimating lenses and beam-aligning mirrors, such as those in FIG. 1A to help facilitate the shaping and alignment of the illumination and observation beams, can be optional and vary with the nature of practical applications. Other auxiliary optical elements may also be implemented in an angled-dual-illumination-axis confocal scanning head of the present invention, to enhance the overall performance. In addition, there are a variety of ways of collecting a third observation beam of fluorescence light, as the above embodiments demonstrate. Further, there can be fourth, fifth, and more beams of fluorescence light being collected, if deemed desirable in a practical application. All in all, a skilled artisan will know how to design an angled-dual-illumination-axis confocal scanning head in accordance with the principles of the present invention, to best suit a given application.

By integrating its constituent optical elements on a silicon substrate, as exemplified in FIGS. 1A, 1C–1D by way of silicon fabrication techniques, the angled-dual-illumination-axis confocal scanning head of the present invention renders a high degree of integrity, maneuverability, scalability, and versatility. Such a design also provides greater flexibility and higher precision in the alignment of various optical elements. Although the particular way of making an angled-dual-illumination-axis confocal scanning head of the present invention an integrated device is dictated by the nature of a given application, a silicon substrate is generally preferred, for it is well known in the art that various V-grooves can be etched on silicon in a very precise manner, as demonstrated in U.S. Pat. No. 6,007,028. The precision of the V-grooves provides an accurate and secure optical alignment among various optical elements hosted by these V-grooves, enabling the angled-dual-illumination-axis confocal scanning head thus constructed to be a reliable and modular device. Using the embodiment of FIG. 1A as a way of example, mirrors 109, 110 can be rotated about their respective axes and translated along V-grooves 113, 114, respectively, to facilitate the optimal intersection of first and second illumination beams 117, 118. First and second focusing lenses 107, 108 can also be translated along V-grooves 113, 114 respectively, to further facilitate the optimal overlapping of illumination and observation focal volumes 99, 98 as illustrated in FIG. 1B. Such alignment procedures can be performed before affixing (e.g., by use of adhesives) various optical elements to their respective V-grooves. The scalability and relatively low cost of silicon fabrication technology add further advantages to this approach. For example, a micro-optic version of such an integrated angled-dual-illumination-axis confocal scanning head can be incorporated in miniature surgical devices, endoscopes, or other in situ devices, suitable for medical applications.

Figure 2A:
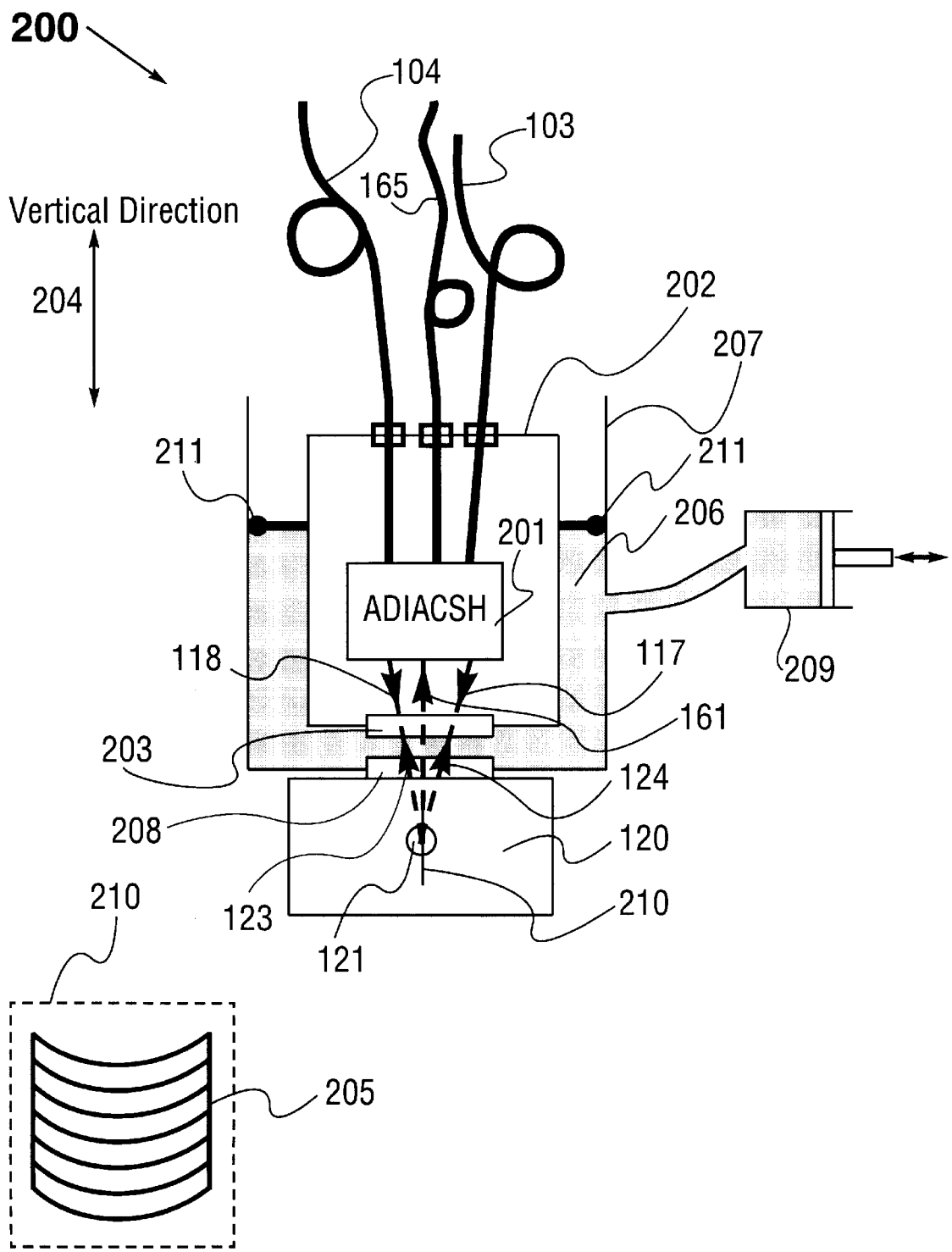
FIGS. 2A–2B depict two exemplary embodiments of an angled-dual-illumination-axis confocal scanning microscope according to the present invention.

To provide a two-dimensional scan, an angled-dual-illumination-axis confocal scanning head of the present invention can be mechanically coupled to a vertical scanning unit, comprising a vertical translation means and a compensation means. The vertical translation means causes the angled-dual-illumination-axis confocal scanning head to move toward or away from the object and hence the illumination and observation beams to probe further into the interior of the object, thereby producing a vertical scan. A two-dimensional vertical cross-section scan of the object is then obtained by assembling a plurality of arc-line scans that progressively deepen into the object. The compensation means keeps the optical paths lengths of the illumination and observation beams substantially unchanged, thereby ensuring the optimal intersection of the respective focal volumes in the course of vertical cross-section scans. The combination of the angled-dual-illumination-axis confocal scanning head and the corresponding vertical scanning unit constitutes an angled-dual-illumination-axis confocal scanning microscope employing vertical cross-section scanning. FIG. 2A depicts an exemplary embodiment of an angled-dual-illumination-axis confocal scanning microscope of the present invention. Angled-dual-illumination-axis confocal scanning microscope 200, by way of example, comprises an angled-dual-illumination-axis confocal scanning head (ADIACSH) 201 and a movable carriage 202. For the purpose of illustration, angled-dual-illumination-axis confocal scanning head 201 is in a simplified schematic form of the embodiment shown in FIG. 1D, although any other embodiments according to the present invention can be equivalently utilized. In the embodiment of FIG. 2A, angled-dual-illumination-axis confocal scanning head 201 is attached to and further enclosed in movable carriage 202, with optical fibers 103, 104, 165 extending to the outside of movable carriage 202. A first transparent window 203 is mounted on movable carriage 202 for passage of first and second illumination beams 117, 118, first and second observation beams 123, 124, and third observation beam 161. Movable carriage 202 can move up and down in a vertical direction as defined by arrow 204, causing angled-dual-illumination-axis confocal scanning head 201 to move toward or away from object 120 in the process. By doing so, confocal overlapping volume 121 of first illumination beam 117 and first observation beam 123, and second illumination beam 118 and second observation beam 124, further deepens into (or retract from) the interior of object 120, whereby a succession of arc-line scans that progressively deepen into object 120 along a vertical cross-section plane 210 is produced, as illustrated by curves 205. The motion of movable carriage 202 can be driven by a variety of means, for instance, by coupling it to a motor (not shown in FIG. 2A) that is activated by a magnetic, hydraulic, piezoelectric, or other actuator. A skilled artisan can accordingly implement a movable stage suitable for a given application.

As the illumination beams and observation beams deepen into the interior of object 120 in the course of vertical scanning, the change in their respective optical path lengths becomes increasingly large, which may cause their respective focal volumes to no longer intersect in an optimal manner, or even not to intersect at all at the point where the two beams physically meet. To maintain the optical path lengths of the illumination beams and observation beams during vertical scanning, the space between movable carriage 202 and object 120 can be filled with a substantially transparent fluid 206 having an index of refraction that is substantially the same as the index of refraction of object 120, such that the optical path lengths of first and second illumination beam 117, 118, and first and second observation beams 123, 124, remain unchanged in the course of vertical scanning. The use of optical fibers further provides the necessary flexibility that enables the whole assembly of angled-dual-illumination-axis confocal scanning head 201 and movable carriage 202 to move up and down without incurring additional change in the optical path lengths of the illumination beams and observation beams. In the embodiment of FIG. 2A, movable carriage 202, along with angled-dual-illumination-axis confocal scanning head 201, is disposed within a container 207 filled with fluid 206. An O-ring seal 211 is provided to seal fluid 206 inside container 207, while still permitting movable carriage 202 to move up and down relative to container 207. Container 207 is equipped with a second transparent window 208, in optical alignment with first transparent window 203 for passage of first and second illumination beams 117, 118, first and second observation beams 123, 124, and third observation beam 161. Container 207 is further connected to a fluid injection system 209, serving as a reservoir for replenishing additional fluid or receiving excess fluid as movable carriage 202 is moving towards or away from object 120. For imaging of human tissue and other biological samples, fluid 206 can be water, which has an index of refraction closely matching that of tissue and biological samples.

It should be noted that certain aberrations of the illumination and observation beams may occur as a result of successive passages of the beams through first and second transparent windows 203, 208, fluid 206, and object 120 in the above embodiment, which may require specific designs of the illumination and observation focusing elements that are corrected for these aberrations. Alternatively, auxiliary optical elements that are properly designed for correcting such aberrations may be implemented in the angled-dual-illumination-axis focusing means. In most cases of a converging beam passing through a window or into another object at an inclined angle, the primary aberrations to be corrected for will be spherical aberration, astigmatism, and coma. The magnitude of these aberrations depend upon many factors, and typically increases with NA of the focusing elements, the index of refraction and the thickness of the window, and the angle of incidence. The design of such aberration-corrected focusing elements, or auxiliary optical elements for correcting aberrations, can be accomplished by a lens designer of ordinary skill and with the help of an optical design computer program such as Zemax™.

In applications where NA of the focusing elements are sufficiently low and the thicknesses of windows, fluid and object through which the illumination and observation beams successively traverse are not large, the aberrations would be small and may not need to be corrected. In such cases, the embodiment shown in FIG. 2A can be utilized, which may incorporate additional remedies for further minimizing aberrations. Such remedies include, for example, using windows made of Teflon AF™ or other materials that are transparent and have an index of refraction closely matching that of water.

Figure 2B:
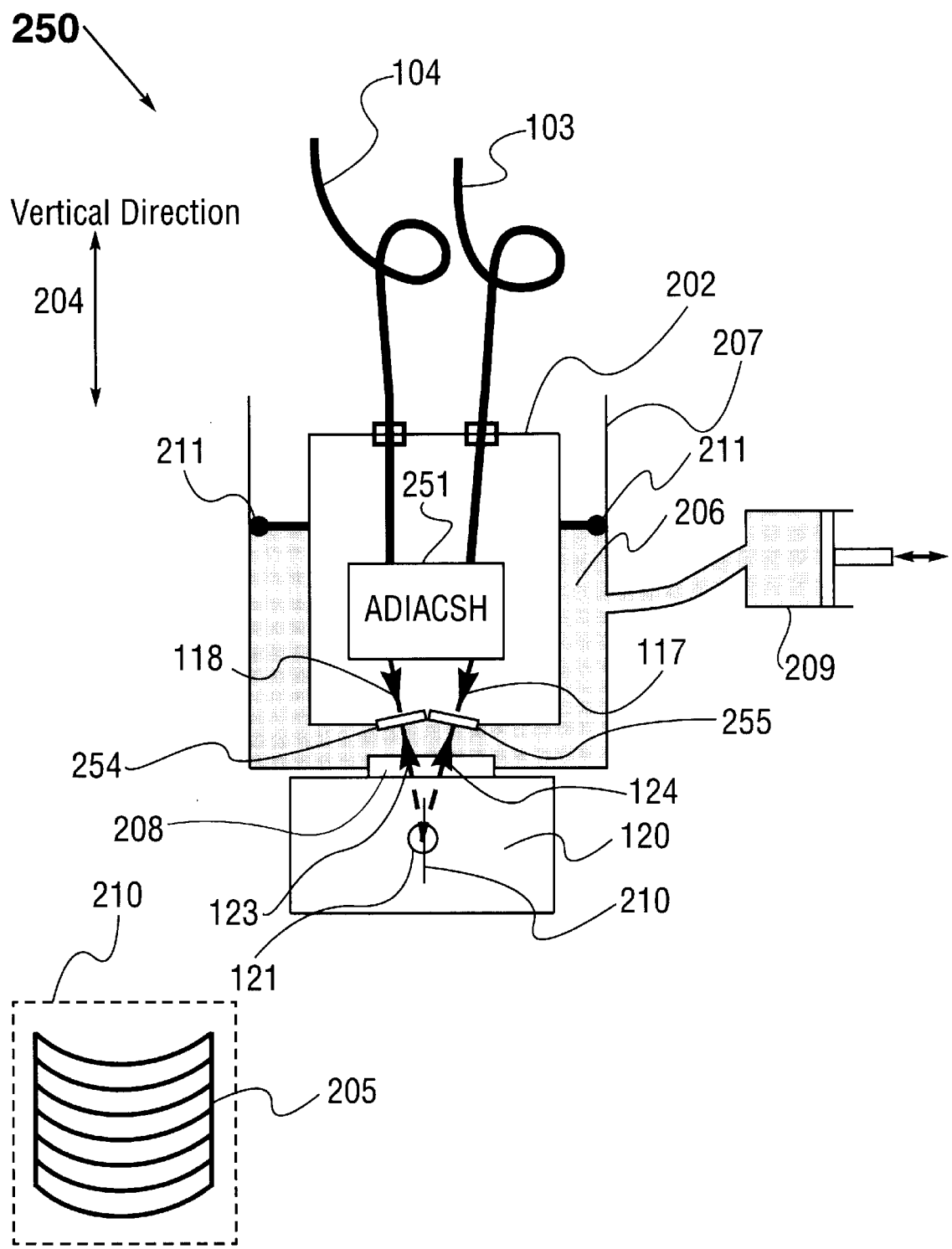

FIG. 2B depicts a second embodiment of an angled-dual-illumination-axis confocal scanning microscope of the present invention, pertaining to applications where the aforementioned aberrations may not be negligible. In angled-dual-illumination-axis confocal scanning microscope 250, by way of example, angled-dual-illumination-axis confocal scanning head 251 is in a simplified schematic form of the embodiment shown in FIG. 1A (or FIG. 1C). A window assembly comprising two flat transparent windows 254, 255 in an angled arrangement is implemented to replace single flat window 203 in FIG. 2A. The remainder of angled-dual-illumination-axis confocal scanning microscope 250 shares the same components as angled-dual-illumination-axis confocal scanning microscope 200 shown in FIG. 2A, as indicated by those labeled with identical numbers. The window assembly is designed such that first axis 97 along with first illumination beam 117 and second axis 96 along with second illumination beam 118 (see FIG. 1B) are substantially perpendicular to flat windows 255, 254, respectively. As such, the window assembly can greatly reduce coma and astigmatism that would otherwise be associated with using a single flat window (such as window 203 in FIG. 2A). Although spherical aberrations still need to be corrected for in this case, the techniques for making such corrections are well known in the art of lens design. For instance, a skilled artisan can make use of the design of microscope objectives that are corrected for glass coverslips of a certain thickness to accomplish this task.

All in all, the angled-dual-illumination-axis confocal scanning microscope of the present invention is designed such that it provides a vertical cross-section scan of an object with enhanced axial resolution, faster speed, larger transverse field of view, lower noise, along with a high degree of versatility in collecting reflectance, single-photon fluorescence, and two-photon fluorescence light. Moreover, by moving the angled-dual-illumination-axis confocal scanning microscope, or translating the object, in a transverse direction perpendicular to vertical cross-section plane 210 illustrated in FIG. 2A (or FIG. 2B), a series of vertical cross-section scans can be taken in a layer-by-layer fashion, which can be assembled to provide a three-dimensional volume image of the object. Alternatively, transverse cross-section scans can also be accomplished by way of arc-line scanning in two orthogonal directions using a bi-axial scanning mirror (which pivots about two orthogonal axes) as the scanning means of the present invention.

Figure 3:
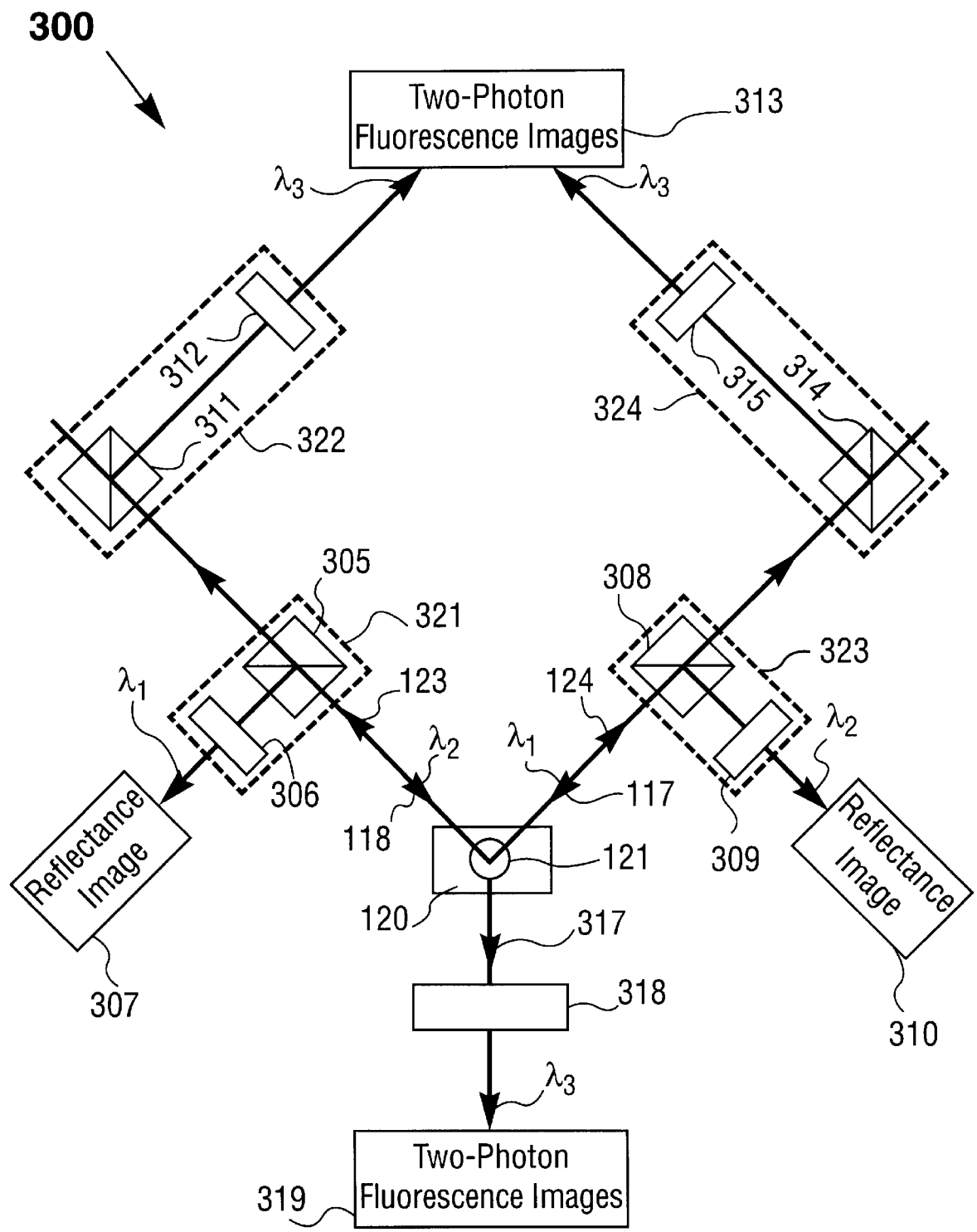
FIG. 3 provides a schematic depiction of how to make use of various optical beams collected by an angled-dual-illumination-axis confocal scanning system according to the present invention.

FIG. 3 provides a schematic illustration of how to make use of the multiple beams collected from an object by an angled-dual-illumination-axis confocal scanning microscope of the present invention. In schematic illustration 300, first illumination beam 117 with a first wavelength $\lambda_1$ and second illumination beam 118 with a second wavelength $\lambda_2$ are directed to intersect at a confocal overlapping volume 121 within an object 120. Accordingly, first and second observation beams 123, 124 emanated from confocal overlapping volume 121 are transmitted back along the reverse directions of second and first illumination beams 118, 117 respectively. To make use of the collected observation beams, a first beam-splitter 305 is optically coupled to first observation beam 123, serving to route a portion of first observation beam 123 to a first optical filter 306. First optical filter 306 may be configured such that only the reflected light with wavelength $\lambda_1$ carried by first observation beam 123 is permitted to pass though, thereby providing a first reflectance image 307. (It should be noted that this particular combination of a beam splitter element and a spectral filter element constitutes one of many different ways known in the art to provide a wavelength-selective-beam-splitting means required to extract a particular spectral component from an observation beam for detection.) A second beam-splitter 311 can be further coupled to first observation beam 123, so as to route an additional amount of first observation beam 123 to a second optical filter 312. Second optical filter 312 may be designed such that only the two-photon fluorescence light with a third wavelength $\lambda_3$ ($1\lambda_3 = 1/\lambda_1 + 1/\lambda_2$) carried by first observation beam 123 is permitted to pass though, thereby providing a two-photon fluorescence image 313. Likewise, a third observation beam-splitter 308 is optically coupled to second observation beam 124, serving to route a fraction of second observation beam 124 to a third optical filter 309. Third optical filter 309 may be configured to permit only the reflected light with wavelength $\lambda_2$ carried by second illumination beam 124 to pass though, thereby providing a second reflectance image 310. A fourth beam-splitter 314 can be further coupled to second observation beam 124, serving to route an additional amount of second observation beam 124 to a fourth optical filter 315. Fourth optical filter 315 can be designed to permit only the two-photon fluorescence light with wavelength $\lambda_3$ carried by second observation beam 124 to pass though, thereby further contributing to two-photon fluorescence image 313. Additionally, a third observation beam 317 emanated from confocal overlapping volume 121 can be collected and routed to a fifth filter 318, which preferentially allows only the two-photon fluorescence light with wavelength $\lambda_3$ to pass through, thereby producing an additional two-photon fluorescence image 319. (The two-photon fluorescence light provided by the third observation beam may also be combined with the two-photon fluorescence light extracted from the first and second observation beams to create a combined two-photon fluorescence image.)

As the embodiment of FIG. 3 demonstrates, a cascade of the beam-splitter/filter elements (or other types of wavelength-selective beam-splitting means) can be optically coupled to either of the first and second observation beams, enabling various spectral components of each of the observation beams to be extracted and detected. Alternatively, the combination beam-splitter/filter elements in the embodiment of FIG. 3 can be replaced by other types of functionally equivalent wavelength-selective-beam-splitting means, such as wavelength-selective-beam-splitting elements 321, 322, 323, 324. As such, by using one or more of the three available observation beams, with the proper wavelengths selected for the first and second illumination beams, and proper wavelength-selective-beam-splitting means for spectral extraction and detection, an angled-dual-illumination-axis confocal scanning microscope of the present invention is capable of providing an assortment of reflectance image, single-photon fluorescence image, one-color two-photon (1C2P) fluorescence image, two-color two-photon (2C2P) fluorescence image, and multi-photon fluorescence images. Furthermore, a superposition of reflectance images and two-photon fluorescence images can be particularly powerful in characterizing a biological sample, for the two types of the images reveals complimentary characteristics of the sample. That is, the reflectance image is generally effective in mapping out the morphology of the sample (such as a particular arrangement or pattern of cells), whereas the two-photon fluorescence image is unique in mapping out particular types of fluorophores contained in the sample (which can reveal the functionality of the cells). Those skilled in the art can selectively make use of the imaging capabilities provided by an angled-dual-illumination-axis confocal scanning microscope of the present invention, so as to best suit a given application. It should be noted that while it is possible to operate the present invention in a number of ways that may provide different combinations of reflectance and fluorescence (single-photon, two-photon, or multiple-photon) images, depending upon the instrument design and the types of light sources/wavelengths used, it is preferable to design the instrument in a way that maximizes the resolution of the images produced and that also minimizes the scattered and/or fluorescent photon noise in the image signals. This can be best accomplished by the following seven design rules, which insure that scattered or fluorescence light generated by each illumination beam is mostly collected only by its corresponding (angularly overlapping) observation beam:

1) In the case where the first observation beam is being used to collect reflectance image information characterized by a first wavelength, the second illumination beam should not include light with the first wavelength, and the first illumination beam must provide light with the first wavelength.

2) In the case where the first observation beam is being used to collect single-photon fluorescence image information characterized by a third wavelength when the object is excited by light of a second wavelength, the second illumination beam should not include single-photon excitation light with the second wavelength, and the first illumination beam should provide single-photon excitation light with the second wavelength.

3) In the case where the first observation beam is being used to collect one-color two-photon (1C2P) fluorescence image information characterized by a fifth wavelength when the object is excited by light of a fourth wavelength, the second illumination beam should not include 1C2P excitation light with the fourth wavelength, and the first illumination beam should provide 1C2P excitation light with the fourth wavelength.

4) In the case where either of the first and second observation beams, or both of the observation beams, are being used to collect two-color two-photon (2C2P) fluorescence image information characterized by an eighth wavelength when the object is excited by light that requires both of sixth and seventh wavelengths, the first and second illumination beams should each provide light with only one of the two required wavelengths, such that 2C2P excitation light is provided only in the region where the two illumination beams overlap both spatially and temporally.

5) In the case where the second observation beam is being used to collect reflectance image information characterized by a ninth wavelength, the first illumination beam should not include light with the ninth wavelength, and the second illumination beam must provide light with the ninth wavelength.

6) In the case where the second observation beam is being used to collect single-photon fluorescence image information characterized by an eleventh wavelength when the object is excited by light of a tenth wavelength, the first illumination beam should not include single-photon excitation light with the tenth wavelength, and the second illumination beam should provide single-photon excitation light with the tenth wavelength.

7) In the case where the second observation beam is being used to collect one-color two-photon (1C2P) fluorescence image information characterized by a thirteenth wavelength when the object is excited by light of a twelfth wavelength, the first illumination beam should not include 1C2P excitation light with the twelfth wavelength, and the second illumination beam should provide 1C2P excitation light with the twelfth wavelength.

Figure 4:
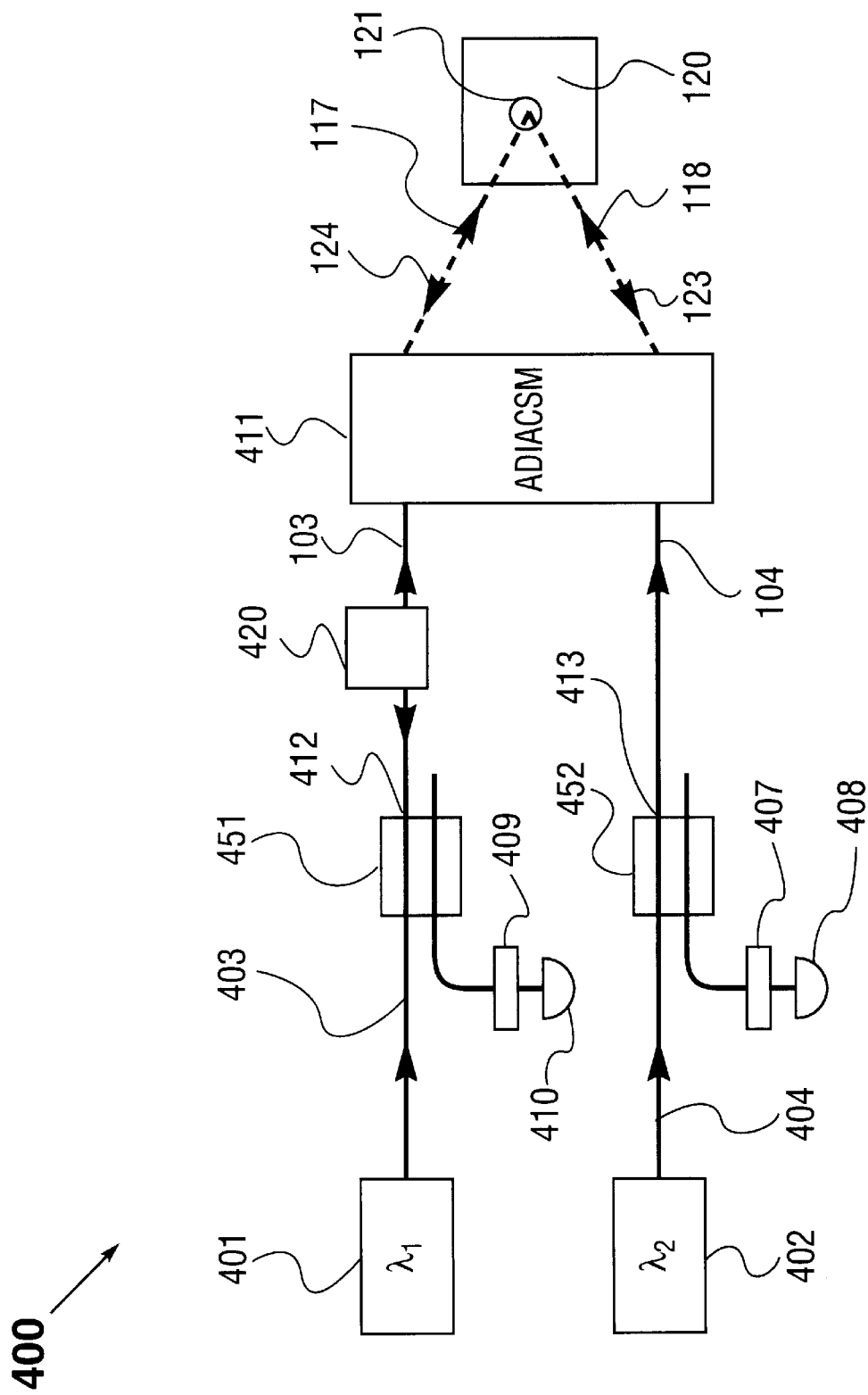
FIG. 4 shows a simplified schematic diagram of a first angled-dual-illumination-axis confocal scanning systems according to the present invention.

FIG. 4 depicts a first exemplary embodiment of an angled-dual-illumination-axis confocal scanning system of the present invention. Angled-dual-illumination-axis confocal scanning system 400 comprises an angled-dual-illumination-axis confocal scanning microscope (ADIACSM) 411, first and second light sources 401, 402, first and second optical fibers 103, 104, third and fourth optical fibers 403, 404, first and second fiber-optic couplers 451, 452, and an optical delay device 420. By way of example, angled-dual-illumination-axis confocal scanning microscope 411 is in a simplified schematic form of the embodiment shown in FIG. 2B. Any other embodiment in accordance with the present invention can be alternatively implemented.

In angled-dual-illumination-axis confocal scanning system 400, first light source 401 is optically coupled to first fiber-optic coupler 451 by way of third optical fiber 403. First fiber-optic coupler 451 is in turn coupled to second end 412 of first optical fiber 103, such that first illumination beam 117 is transmitted to angled-dual-illumination-axis confocal scanning microscope 411. Similarly, second light source 402 is optically coupled to second fiber-optic coupler 452 by way of fourth optical fiber 404. Second fiber-optic coupler 452 is in turn coupled to second end 413 of second optical fiber 104, such that second illumination beam 118 is transmitted to angled-dual-illumination-axis confocal scanning microscope 411. In this case, first observation beam 123 collected by angled-dual-illumination-axis confocal scanning microscope 411 is delivered back to second fiber-optic coupler 452 by second optical fiber 104, where a fraction of first observation beam 123 is diverted to first optical detector 408 via first optical filter 407, such that a desirable spectral component (e.g., reflected light, or two-photon fluorescence light) carried by first observation beam 123 can be extracted and detected. Likewise, second observation beam 124 collected by angled-dual-illumination-axis confocal scanning microscope 411 is delivered back to first fiber-optic coupler 451 by first optical fiber 103, where a fraction of second observation beam 124 is diverted to second optical detector 410 via second optical filter 409, such that a desirable spectral component (e.g., reflected light, or two-photon fluorescence light) carried by second observation beam 124 can be extracted and detected. Adjustable optical delay device 407 serves to ensure a concurrent spatial and temporal overlap of first and second illumination beams 117, 118. As a way of example, each of first and second fiber-optic couplers 451, 452 can be a 50/50 fiber-optical coupler. For a better efficiency, each of first and second fiber-optic couplers 451, 452 can also be a fiber-optic wavelength division multiplexer (WDM) of a proper design, which is known in the art of broadband fiber-optic communications systems.

Figure 5:
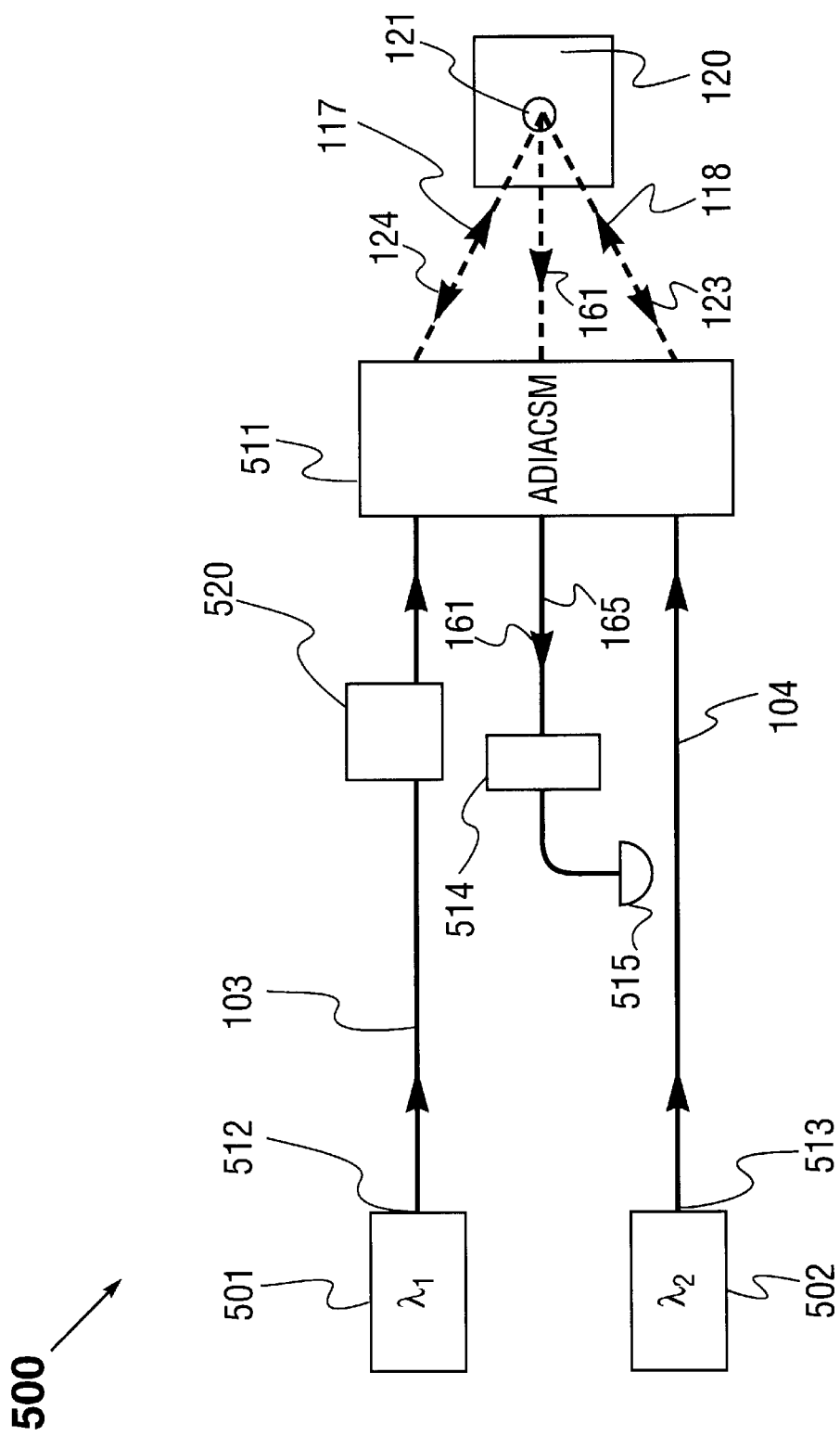
FIG. 5 depicts a simplified schematic diagram of a second angled-dual-illumination-axis confocal scanning system according to the present invention.

FIG. 5 depicts a second exemplary embodiment of an angled-dual-illumination-axis confocal scanning system of the present invention, which utilizes a third observation beam collected from an object. Angled-dual-illumination-axis confocal scanning system 500 comprises an angled-dual-illumination-axis confocal scanning microscope (ADIACSM) 511, first and second light sources 501, 502, first, second and third optical fibers 103, 104, 165, fourth and fifth optical fibers 503, 504, and an adjustable optical delay device 520. By way of example, angled-dual-illumination-axis confocal scanning microscope 411 is in a simplified schematic form of the embodiment shown in FIG. 2A. Any other embodiment in accordance with the present invention can be alternatively implemented. First light source 501 is optically coupled to a second end 512 of first optical fiber 103, thereby providing first illumination beam 117 to angled-dual-illumination-axis confocal scanning microscope 511. Similarly, second light source 502 is optically coupled to a second end 513 of second optical fiber 104, thereby providing second illumination beam 118 to angled-dual-illumination-axis confocal scanning microscope 511. A third observation beam 161 emanated from confocal overlapping volume 121 within object 120 is collected by angled-dual-illumination-axis confocal scanning microscope 411, and then transmitted to third optical fiber 165. An optical detector 515 is optically coupled to third optical fiber 165 via an optical filter 514, so as to extract and detect two-photon fluorescence light carried by third observation beam 165. As in the embodiment of FIG. 4, adjustable optical delay device 520 serves to ensure a concurrent spatial and temporal overlap of first and second illumination beams 117, 118.

In the aforementioned angled-dual-illumination-axis confocal scanning systems, either of the first and second light sources can be a fiber laser, a semiconductor laser, a diode-pumped solid state laser, or a pulsed fiber-coupled light source known in the art. Optical filters can be dichroic beam splitters (or filters), or interference bandpass filters. Optical detectors can be photodiodes, avalanche photodiodes (APD), or photomultiplier tubes (PMT). A skilled artisan can implement appropriate light sources suitable for a given application. In applications where pulsed laser sources are employed, care must be taken to ensure a concurrent spatial and temporal overlap of the first and second illumination beams. This can be accomplished by implementing an adjustable optical delay device along the path of one of the illumination beams, as illustrated in the embodiments of FIGS. 4 and 5.

Figure 6:
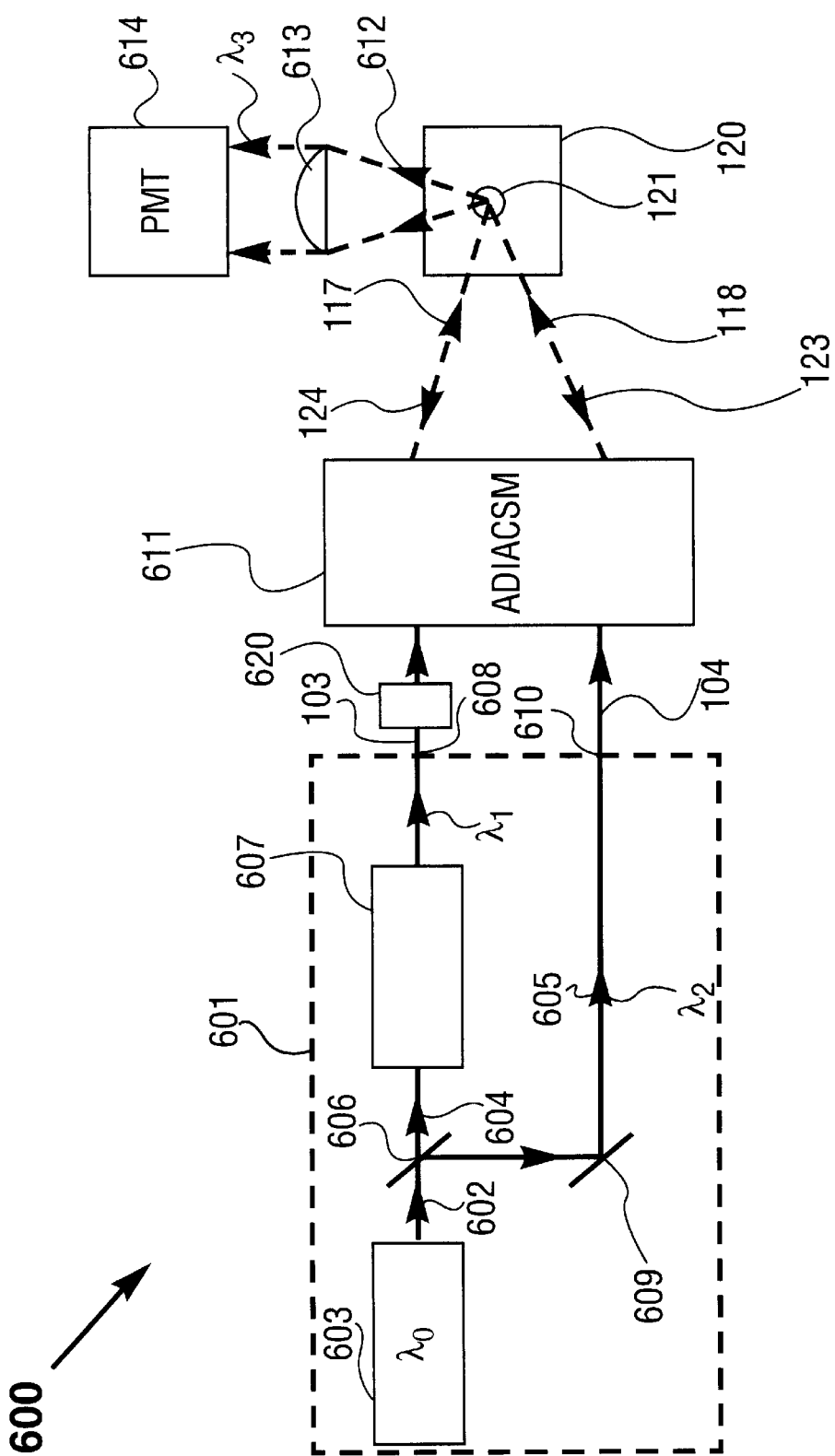
FIG. 6 shows a simplified schematic diagram of a third angled-dual-illumination-axis confocal scanning system according to the present invention.

Alternatively, the two illumination beams in an angled-dual-illumination-axis confocal scanning system of the present invention can be derived from a single light source by means of a frequency doubler (e.g., a frequency-doubling crystal). FIG. 6 depicts a third exemplary embodiment of an angled-dual-illumination-axis confocal scanning system of the present invention. Angled-dual-illumination-axis confocal scanning system 600 comprises a light source assembly 601, an angled-dual-illumination-axis confocal scanning microscope 611, first and second optical fibers 103, 104. As a way of example, angled-dual-illumination-axis confocal scanning microscope 611 is in a simplified schematic form of the embodiment shown in FIG. 2B. Any other embodiment in accordance with the present invention can be alternatively implemented. In light source assembly 601, by way of example, an output beam 602 with wavelength $\lambda_o$ (e.g., $\lambda_o$=750 nm) emitted from a single light source 603 is first split into first and second beams 604, 605 by a beam-splitting means in the form of a half-silvered mirror 606. First beam 604 is then directed to a frequency doubler 607, in which its wavelength is halved (or frequency doubled). The emerging beam from frequency doubler 607 is further passed onto a second end 608 of first optical fiber 103, serving as first illumination beam 117 with wavelength $\lambda_1$ (e.g., $\lambda_1=375$ nm). Second beam 605 is diverted to and further directed by a reflective mirror 609 onto a second end 610 of second optical fiber 104, providing second illumination beam 118 with $\lambda_2$ (e.g., $\lambda_2=\lambda_o=750$ nm). The system thus constructed can be used to perform two-color two-photon (2C2P) fluorescence microscopy in an angled-dual-illumination-axis confocal arrangement. In addition to detecting first and second observation beams 123, 124, a third observation beam 612 comprising predominantly two-color two-photon fluorescence light emanated from confocal overlapping volume 121 within object 120 is collected by an auxiliary focusing means in the form of a focusing lens 613, which further directs the collected fluorescence light to an optical detector in the form of a photomultiplier tube 614. As in the embodiments of FIGS. 4–5, adjustable optical delay 620 serves to ensure a concurrent spatial and temporal overlap of first and second illumination beams 117, 118.

The single light source in the embodiment of FIG. 6 can be a subpicosecond high repetition rate pulsed laser source which is known in the art, such as a fiber laser, Ti:Sapphire laser, diode-pumped solid state laser, or dye laser.

In the angled-dual-illumination-axis confocal scanning systems described above, fiber-optic couplers are used to serve as beam-splitting means. Optical fibers, preferably single-mode fibers, are employed for the purpose of providing optical coupling. Alternatively, the combined function of a fiber-optic coupler and the corresponding optical filter (such as fiber-optic coupler 451 and optical filter 409, or fiber-optic coupler 452 and optical filter 407), serving to provide a wavelength-selective-beam-splitting means, can be replaced by a functionally equivalent, however more efficient fiber-optic wavelength division mutiplexer (WDM). These fiber-optic components, along with the fiber-coupled angled-dual-illumination-axis confocal scanning module of the present invention, enable the confocal scanning systems thus constructed to be all fiber-based systems, hence fully exploiting the flexibility, scalability, ruggedness and economical value afforded by optical fibers.

Alternatively, those skilled in the art may substitute the fiber-optic couplers and WDM's by other types of wavelength-selective-beam-splitting and beam-routing means, such as assemblies of dichroic beam-splitters and dichroic filters, and replace the optical fibers by other types of free space or bulk optical coupling means well known in the art, in the angled-dual-illumination-axis confocal scanning systems of the present invention without deviating from the principle and the scope of the present invention. Further, the methods for detection of optical signals and for electronic processing of the detected signals into images are well known in the art. A skilled artisan can make suitable design choices for a given application.

All in all, the angled-dual-illumination-axis confocal scanning microscope of the present invention provides many advantages over the prior art systems, most notably: enhanced axial resolution while maintaining a workable working distance and a large field of view, fast and high-precision scanning, lower noise and larger dynamic range of detection, and an integrated and scalable structure. Moreover, by utilizing two illumination beams, the angled-dual-illumination-axis confocal scanning microscope of the present invention is capable of providing an assortment of reflectance and fluorescence images, rendering it particularly powerful for imaging biological samples. Additionally, the integration of the angled-dual-illumination-axis confocal scanning microscope of the present invention with fiber-optic components and fiber-coupled laser sources provides an assembly of fiber-based angled-dual-illumination-axis confocal scanning systems, which are specially useful tools for biological and medical imaging applications, such as instruments for performing optical coherence microscopy and in vivo optical biopsies.

For biological tissue imaging applications, the useful wavelengths of light generally ranges from about 0.4 microns to 1.6 microns. Embodiments of the angled-dual-illumination-axis confocal scanning microscope of the present invention are capable of achieving a resolution of about 1–5 microns in the axial (e.g., the vertical direction shown in FIG. 2A) as well as the transverse directions, by use of illumination and observation lenses with NA typically ranging from 0.1 to 0.4, and the intersecting angle θ typically ranging from 45° to 90°. A typical vertical cross-section scan area is on the order of about 0.1–1 millimeter in both directions. In terms of scanning capabilities, the fast scan rate along an arc-line typically ranges from 1 to 10 KHz, and the maximum rotation angle (e.g., φ in FIG. 1A) from a neutral position of the scanning mirror (e.g., scanning mirror 111 in FIG. 1A) may range from one to several degrees. Generally, the smaller and the lighter the scanning mirror, the faster the scanning rate. For instance, using a silicon micro-machined scanning mirror can provide scanning rates greater than 10 kHz. The vertical scanning can be performed at a slower rate of 10–60 Hz, which defines the frame rate of vertical cross-section scanning and is in the range of video-rate scanning.

The specific numbers provided above are designed for tissue imaging, to illustrate the utility and the performance of the present invention as a way of example. A skilled artisan can utilize model calculations known in the art of confocal theta microscopy to design an angled-dual-illumination-axis confocal scanning microscope in accordance with the present invention, for a given application.

Although the present invention and its advantages have been described in detail, it should be understood that various changes, substitutions, and alternations can be made herein without departing from the principle and the scope of the invention. Accordingly, the scope of the present invention should be determined by the following claims and their legal equivalents.

What is claimed is:

1. An angled-dual-illumination-axis confocal scanning system comprising an angled-dual-illumination-axis confocal scanning head, wherein said angled-dual-illumination-axis confocal scanning head comprises:

a) a first optical fiber having first and second ends, for providing a first illumination beam with a first wavelength at said first end;

b) a second optical fiber having third and fourth ends, for providing a second illumination beam with a second wavelength at said third end;

c) an angled-dual-axis focusing means for focusing said first and second illumination beams to first and second focal volumes along first and second axes respectively within an object, and for receiving first and second observation beams emanated from second and first focal volumes along second and first axes respectively within said object, whereby said first and second observation beams are focused onto said third end and said first end respectively; and d) a scanning means for producing an arc-line scan, wherein said scanning means is in optical communication with said angled-dual-illumination-axis focusing means and said object, wherein said scanning means receives said first and second illumination beams from said angled-dual-illumination-axis focusing means and directs said first and second illumination beams to said first and second focal volumes respectively within said object, and wherein said scanning means collects said first and second observation beams emanated from said second and first focal volumes respectively and passes said first and second observation beams to said angled-dual-illumination-axis focusing means;

wherein said first and second axes intersect at an angle within said object, such that said first and second focal volumes intersect optimally at a confocal overlapping volume, and wherein said scanning means is capable of pivoting said first illumination and observation beams, along with said second illumination and observation beams, in such a way that said first and second axes remain intersecting at said angle and that said confocal overlapping volume moves along an arc-line within said object, thereby producing said arc-line scan.

2. The angled-dual-illumination-axis confocal scanning system of claim 1 wherein said first wavelength is substantially equal to said second wavelength.

3. The angled-dual-illumination-axis confocal scanning system of claim 2 wherein said first wavelength and said second wavelength are in the infrared range.

4. The angled-dual-illumination-axis confocal scanning system of claim 1 wherein said first wavelength is not equal to said second wavelength.

5. The angled-dual-illumination-axis confocal scanning system of claim 4 wherein said first wavelength is in the infrared range, and said second wavelength is in the visible range.

6. The angled-dual-illumination-axis confocal scanning system of claim 4 wherein each of said first wavelength and said second wavelength is in the infrared range.

7. The angled-dual-illumination-axis confocal scanning system of claim 1 wherein a combination of said first and second illumination beams provides excitation for producing a two-color two-photon (2C2P) fluorescence light within said confocal overlapping volume in said object, and wherein a reciprocal of the wavelength of said two-photon fluorescence light is equal to a sum of respective reciprocals of said first and second wavelengths.

8. The angled-dual-illumination-axis confocal scanning system of claim 7 wherein either of said first and second observation beams comprises said two-photon fluorescence light emanated from said confocal overlapping volume within said object.

9. The angled-dual-illumination-axis confocal scanning system of claim 1 wherein said first observation beam comprises a reflected light with said first wavelength and said second observation beam comprises a reflected light with said second wavelength.

10. The angled-dual-illumination-axis confocal scanning system of claim 1 wherein said scanning means further collects a third observation beam emanated from said confocal overlapping volume within said object and directs said third observation beam to an auxiliary focusing means, whereby said auxiliary focusing means focuses said third observation beam onto an input end of a third optical fiber.

11. The angled-dual-illumination-axis confocal scanning system of claim 10 wherein said first and second optical fibers are single-mode fibers operating at said first and second wavelengths respectively, and wherein said third optical fiber is a single-mode fiber operating at a wavelength associated with fluorescence light of at least one type selected from the group consisting of single-photon fluorescence, one-color two-photon fluorescence, and two-color two-photon fluorescence.

12. The angled-dual-illumination-axis confocal scanning system of claim 1 wherein said scanning means further collects a third observation beam emanated from said confocal overlapping volume within said object and directs said third observation beam to an auxiliary focusing means, whereby said auxiliary focusing means focuses said third observation beam onto an optical detector.

13. The angled-dual-illumination-axis confocal scanning system of claim 1 further comprising an auxiliary focusing means, and wherein said auxiliary focusing means collects a third observation beam emanated from said confocal overlapping volume within said object and directs said third beam onto an input end of a third optical fiber.

14. The angled-dual-illumination-axis confocal scanning system of claim 13 wherein said first and second optical fibers are single-mode fibers operating at said first and second wavelengths respectively, and wherein said third optical fiber is a multi-mode fiber operating at a wavelength associated with fluorescence light of at least one type selected from the group consisting of single-photon fluorescence, one-color two-photon fluorescence, and two-color two-photon fluorescence.

15. The angled-dual-illumination-axis confocal scanning system of claim 1 further comprising an auxiliary focusing means, and wherein said auxiliary focusing means collects a third observation beam emanated from said confocal overlapping volume within said object and directs said third observation beam onto an optical detector.

16. The angled-dual-illumination-axis confocal scanning system of claim 1 further comprising first and second light sources optically coupled to said second end of said first optical fiber and said fourth end of said second optical fiber respectively.

17. The angled-dual-illumination-axis confocal scanning system of claim 16 wherein said first light source is optically coupled to said first optical fiber by way of a wavelength-selective-beam-splitting means.

18. The angled-dual-illumination-axis confocal scanning system of claim 17 further comprising an optical detector, optically coupled to said wavelength-selective-beam-splitting means.

19. The angled-dual-illumination-axis confocal scanning system of claim 18 wherein said wavelength-selective-beam-splitting means comprises one or more elements selected from the group consisting of dichroic beam-splitters, dichroic filters, bandpass filters, beam-splitters, spectral filters, and wavelength division multiplexers (WDM).

20. The angled-dual-illumination-axis confocal scanning system of claim 18 wherein said wavelength-selective-beam-splitting means comprises a fiber-optic WDM coupler.

21. The angled-dual-illumination-axis confocal scanning system of claim 16 wherein said second light source is optically coupled to said second optical fiber by way of a wavelength-selective-beam-splitting means.

22. The angled-dual-illumination-axis confocal scanning system of claim 21 further comprising an optical detector, optically coupled to said wavelength-selective-beam-splitting means.

23. The angled-dual-illumination-axis confocal scanning system of claim 22 wherein said wavelength-selective-beam-splitting means comprises one or more elements selected from the group consisting of dichroic beam-splitters, dichroic filters, bandpass filters, beam-splitters, spectral filters, and wavelength division multiplexers (WDM).

24. The angled-dual-illumination-axis confocal scanning system of claim 22 wherein said wavelength-selective-beam-splitting means comprises a fiber-optic WDM coupler.

25. The angled-dual-illumination-axis confocal scanning system of claim 16 further comprising an auxiliary focusing means, whereby said auxiliary focusing means collects a third observation beam emanated from said confocal overlapping volume within said object and directs said third observation beam onto an input end of a third optical fiber.

26. The angled-dual-illumination-axis confocal scanning system of claim 25 further comprising an optical detector, optically coupled to an output end of said third optical fiber.

27. The angled-dual-illumination-axis confocal scanning system of claim 16 further comprising an auxiliary focusing means, whereby said auxiliary focusing means collects a third observation beam emanated from said confocal overlapping volume within said object and directs said third observation beam onto an optical detector.

28. The angled-dual-illumination-axis confocal scanning system of claim 16 wherein either of said first and second light sources comprises an element selected from the group consisting of fiber lasers, semiconductor lasers, diode-pumped solid state lasers, and pulsed lasers.

29. The angled-dual-illumination-axis confocal scanning system of claim 16 further comprising an adjustable optical delay device optically coupled to either of said first and second optical fibers, so as to ensure a concurrent spatial and temporal overlap of said first and second illumination beams.

30. The angled-dual-illumination-axis confocal scanning system of claim 1 wherein said first and second illumination beams are derived from a single light source by way of an assembly of beam-splitting means and frequency-doubling means, whereby said first and second wavelengths are not equal.

31. The angled-dual-illumination-axis confocal scanning system of claim 30 further comprising an adjustable optical delay device optically coupled to either of said first and second optical fibers, so as to ensure a concurrent spatial and temporal overlap of said first and second illumination beams.

32. The angled-dual-illumination-axis confocal scanning system of claim 30 further comprising an auxiliary focusing means, whereby said auxiliary focusing means collects a third observation beam emanated from said confocal overlapping volume within said object and directs said third observation beam onto an optical detector.

33. The angled-dual-illumination-axis confocal scanning system of claim 1 further comprising a vertical scanning unit, wherein said vertical scanning unit comprises:

a) a translation means mechanically coupled to said angled-dual-illumination-axis confocal scanning head; and b) a compensation means for ensuring said optimal intersection of said first and second focal volumes;

wherein said translation means is capable of causing said angled-dual-illumination-axis confocal scanning head to move relative to said object, whereby a succession of arc-line scans that progressively deepen into said object is produced, providing a vertical cross-section scan.

34. The angled-dual-illumination-axis confocal scanning system of claim 33 wherein said compensation means comprises a fluid filling a space between said scanning means and said object, wherein said fluid is substantially transparent to said first and second illumination beams, and one or more of said first and second observation beams, and wherein said fluid has an index of refraction that is substantially the same as an index of refraction of said object.

35. The angled-dual-illumination-axis confocal scanning system of claim 34 further comprising a window assembly interposed between said scanning means and said fluid for passage of said first and second illumination beams, and one or more of said first and second observation beams.

36. The angled-dual-illumination-axis confocal scanning system of claim 35 wherein said window assembly comprises a substantially transparent flat window.

37. The angled-dual-illumination-axis confocal scanning system of claim 35 wherein said window assembly comprises first and second substantially transparent flat windows in an angled arrangement, such that said first axis is substantially perpendicular to said first flat window and said second axis is substantially perpendicular to said second flat window.

38. The angled-dual-illumination-axis confocal scanning system of claim 34 further comprising a transparent window interposed between said fluid and said object for passage of said first and second illumination beams, and said first and second observation beams.

39. The angled-dual-axis confocal scanning system of claim 34 wherein said fluid is contained in a sealed hydraulic system, including a reservoir for replenishing and receiving excess fluid in the course of vertical cross-section scans.

40. The angled-dual-illumination-axis confocal scanning system of claim 1 wherein said angled-dual-illumination-axis focusing means comprises one or more elements selected from the group consisting of refractive lenses, diffractive lenses, GRIN lenses, focusing gratings, micro-lenses, holographic optical elements, curved mirrors, and binary lenses.

41. The angled-dual-illumination-axis confocal scanning system of claim 40 wherein said angled-dual-axis focusing means comprises a single element, where said element provides said first axis and said second axis.

42. The angled-dual-illumination-axis confocal scanning system of claim 40 wherein said angled-dual-illumination-axis focusing means comprises first and second focusing elements, wherein said first and second focusing elements provide said first and second axes respectively.

43. The angled-dual-illumination-axis confocal scanning system of claim 42 wherein said first and second focusing elements are of the same type, comprising a focusing element selected from the group consisting of refractive lenses, diffractive lenses, GRIN lenses, micro-lenses, binary lenses, and curved mirrors.

44. The angled-dual-illumination-axis confocal scanning system of claim 43 wherein said focusing element has a numerical aperture (NA) in the range of 0.1 and 0.4.

45. The angled-dual-illumination-axis confocal scanning system of claim 42 wherein said angled-dual-illumination-axis focusing means comprises first and second collimating lenses, wherein said first collimating lens is interposed between said first end of said first optical fiber and said first focusing element, and wherein said second collimating lens is interposed between said first end of said second optical fiber and said second focusing element.

46. The angled-dual-illumination-axis confocal scanning system of claim 1 wherein said scanning means comprises one or more elements selected from the group consisting of scanning mirrors, reflectors, acousto-optic deflectors, electro-optic deflectors, mechanical scanning mechanisms, and Micro-Electro-Mechanical-Systems (MEMS) scanning micro-mirrors.

47. The angled-dual-illumination-axis confocal scanning system of claim 46 wherein said scanning means comprises a single scanning mirror, wherein said scanning mirror is substantially flat and can be pivoted about one axis.

48. The angled-dual-illumination-axis confocal scanning system of claim 47 wherein said scanning mirror is a single silicon micro-machined mirror.

49. The angled-dual-illumination-axis confocal scanning system of claim 46 wherein said scanning means comprises two scanning mirrors that are substantially coplanar, wherein said scanning mirrors are substantially flat and can co-rotate substantially about one common axis.

50. The angled-dual-illumination-axis confocal scanning system of claim 49 wherein said scanning mirrors are silicon micro-machined mirrors.

51. The angled-dual-illumination-axis confocal scanning system of claim 46 wherein said scanning means comprises two scanning mirrors, wherein each of said scanning mirrors is substantially flat and can be pivoted about one or more axes, and wherein said scanning mirrors are configured such that they can be operated in substantially synchronous motion.

52. The angled-dual-illumination-axis confocal scanning system of claim 51 wherein said scanning mirrors are silicon micro-machined mirrors.

53. The angled-dual-illumination-axis confocal scanning system of claim 46 wherein said scanning means comprises a single scanning mirror, and wherein said scanning mirror is substantially flat and can be pivoted about two orthogonal axes, thereby providing arc-line scanning in two orthogonal directions.

54. The angled-dual-illumination-axis confocal scanning system of claim 1 wherein said angled-dual-illumination-axis confocal scanning head is mechanically coupled to a substrate.

55. The angled-dual-illumination-axis confocal scanning system of claim 54 wherein said substrate comprises a silicon substrate etched with V-grooves.

56. The angled-dual-illumination-axis confocal scanning system of claim 1 wherein either of said first and second optical fibers comprises an element selected from the group consisting of single-mode fibers and multi-mode fibers.

57. The angled-dual-illumination-axis confocal scanning system of claim 1 wherein said first and second focal volumes are diffraction-limited, determined by main lobes of said first illumination beam's point-spread function and said second illumination beam's point-spread function.

58. The illumination confocal scanning system of claim 57 wherein said confocal overlapping volume is diffraction-limited.

59. A method of performing angled-dual-illumination-axis confocal scanning microscopy employing vertical cross-section scanning on a sample, comprising:
   a) transmitting a first illumination beam emerging from a first end of a first optical fiber and a second illumination beam emerging from a third end of a second optical fiber to an angled-dual-illumination-axis focusing means, wherein said first and second illumination beams have first and second wavelengths respectively;
   b) passing said first and second illumination beams from said angled-dual-illumination-axis focusing means to a scanning means;
   c) using said scanning means to direct said first illumination beam to a first focal volume along a first axis and said second illumination beam to a second focal volume along a second axis within said sample, wherein said first and second axes intersect at an angle within said sample, such that said first and second focal volumes intersect optimally at a confocal overlapping volume;
   d) using said scanning means to collect first and second observation beams emanated from said second and first focal volumes within said sample respectively;
   e) passing said first and second observation beams from said scanning means to said angled-dual-illumination-axis focusing means;
   f) focusing said first and second observation beams onto said third end of said second optical fiber and said first end of said first optical fiber respectively; and
   g) pivoting said scanning means in such a way that said first and second axes remain intersecting at said angle and that said confocal overlapping volume moves along an arc-line within said sample, thereby producing an arc-line scan.

60. The method of claim 59 further comprising the step of collecting a third observation beam emanated from said confocal overlapping volume within said sample and focusing said third observation beam onto an input end of a third optical fiber.

61. The method of claim 60 wherein said third observation beam is collected by said scanning means, thereby constituting a confocal-collection of said third observation beam.

62. The method of claim 60 wherein said third observation beam is collected by an auxiliary focusing scanning means, thereby providing a non-confocal-collection of said third observation beam.

63. The method of claim 60 further comprising the step of filtering said third observation beam emerging from an output end of said third optical fiber, such that fluorescence light carried by said third observation beam is detected.

64. The method of claim 63 wherein said fluorescence light is of at least one type selected from the group consisting of single-photon fluorescence, one-color two-photon fluorescence, and two-color two-photon fluorescence.

65. The method of claim 59 further comprising the step of filtering said first observation beam emerging from said second end of said first optical fiber, such that a reflected light carried by said first observation beam is detected.

66. The method of claim 59 further comprising the step of filtering said first observation beam emerging from said second end of said first optical fiber, such that a two-photon fluorescence light carried by said first observation beam is detected.

67. The method of claim 59 further comprising the step of filtering said second observation beam emerging from said fourth end of said second optical fiber, such that a reflected light carried by said second observation beam is detected.

68. The method of claim 59 further comprising the step of filtering said second observation beam emerging from said fourth end of said second optical fiber, such that a two-photon fluorescence light carried by said first observation beam is detected.

69. The method of claim 59 further comprising the step of ensuring a concurrent spatial and temporal overlap of said first and second illumination beams.

70. The method of claim 59 further comprising the step of coupling a light source to a second end of said first optical fiber by way of a fiber-optic WDM coupler, thereby transmitting said first illumination beam from said light source to said first optical fiber.

71. The method of claim 70 further comprising the step of detecting a portion of said second observation beam diverted by said fiber-optic WDM coupler.

72. The method of claim 59 further comprising the step of coupling a light source to a fourth end of said second optical fiber by a fiber-optic WDM coupler, thereby transmitting said second illumination beam from said light source to said second optical fiber.

73. The method of claim 72 further comprising the step of detecting a portion of said first observation beam diverted by said fiber-optic WDM coupler.

74. The method of claim 59 wherein said first and second wavelengths are substantially equal.

75. The method of claim 59 wherein said first and second wavelengths are not equal.

76. The method of claim 59 further comprising the step of moving said first and third ends of said first and second optical fibers, said angled-dual-illumination-axis focusing means, and said scanning means in unity relative to said sample and repeating said step of g), whereby a succession of arc-line scans that progressively deepen into said sample is produced, providing a vertical cross-section scan.

77. The method of claim 76 further comprising the step of filling a space between said scanning means and said sample with a fluid, wherein said fluid is substantially transparent to said first and second illumination beams, and one or more of said first and second observation beams, and wherein said fluid has an index of refraction that is substantially the same as an index of refraction of said sample, for ensuring said optimal intersection of said first and second focal volumes in the course of vertical cross-section scans.

78. The method of claim 77 further comprising the step of disposing a window assembly between said scanning means and said fluid for passage of said first and second illumination beams, and one or more of said first and second and observation beams.

79. The method of claim 77 further comprising the step of disposing a transparent window between said fluid and said sample for passage of said first and second illumination beams, and one or more of said first and second and observation beams.

80. The method of claim 59 wherein said scanning means is provided by a substantially flat scanning mirror that can be pivoted about one axis.

81. The method of claim 80 wherein said rotating mirror is a silicon micro-machined scanning mirror.

82. The method of claim 59 wherein said scanning means is provided by a substantially flat scanning mirror that can be pivoted about two orthogonal axes, and wherein said method further comprises the step of pivoting said scanning mirror about said two orthogonal axes, thereby producing arc-line scanning in two orthogonal directions.

83. The method of claim 59 wherein said scanning means is provided by two substantially coplanar scanning mirrors that are substantially flat and can co-rotate substantially about one common axis.

84. The method of claim 83 wherein said scanning mirrors are silicon micro-machined scanning mirrors.

\* \* \* \* \*